United States Patent [19]
Afify et al.

[11] Patent Number: 5,291,485
[45] Date of Patent: Mar. 1, 1994

[54] METHOD AND APPARATUS FOR TRANSLATING DIFFERENTLY-SIZED VIRTUAL TRIBUTARIES ORGANIZED ACCORDING TO A SYNCHRONOUS OPTICAL NETWORK (SONET) STANDARD

[75] Inventors: Manal Afify, Raleigh; Allen W. Moore, Cary; Claude M. Hurlocker, Raleigh, all of N.C.

[73] Assignee: Alcatel Network Systems, Inc., Richardson, Tex.

[21] Appl. No.: 837,472

[22] Filed: Feb. 18, 1992

[51] Int. Cl.[5] .............................................. H04J 3/00
[52] U.S. Cl. .................................... 370/77; 370/99
[58] Field of Search .................... 370/77, 55, 53, 43, 370/84, 99, 60; 340/825.79, 825.89

[56] References Cited
U.S. PATENT DOCUMENTS
| | | | |
|---|---|---|---|
| 4,979,169 | 12/1990 | Almond et al. | 370/99 |
| 5,040,170 | 8/1991 | Upp et al. | 370/99 |
| 5,060,229 | 10/1991 | Tyrrell et al. | 370/99 |
| 5,144,297 | 9/1992 | Ohara | 340/825.79 |

Primary Examiner—Douglas W. Olms
Assistant Examiner—Shick Hom
Attorney, Agent, or Firm—Ware, Fressola, Van Der Sluys & Adolphson

[57] ABSTRACT

A SONET virtual tributary reformatter has a drop encoder that receives incoming data of a second VT size mapped according to first VT size and provides the data in a format designed for the first VT size and also has an add decoder that receives outgoing data signals of the second VT size in the format of the first VT size and provides the outgoing data of the second VT size mapped according to the first VT size.

9 Claims, 27 Drawing Sheets

FIGURE 4(a)
| ROW\COL | 28 | 29 | 30 | 31 | 0 | 1 | 2 | 3 | 4 | 5 | 6 | 7 | 8 | 9 | 10 |
|---|---|---|---|---|---|---|---|---|---|---|---|---|---|---|---|
| 24 | H1 | H2 | H3 | J1.0 | 1 | 2 | 3.4 | 5 | 6 | 7.8 | 9.10 | | | | |
| 25 | | | | 31 | 0 | 1 | 2 | 3.4 | 5 | 6 | 7.8 | 9 | 10 | | |
| 26 | | | | 31 | 0 | 1 | 2 | 3.4 | 5 | 6 | 7.8 | 9 | 10 | | |
| 0 | B2 | K1 | K2 | B3.0 | 1 | 2 | 3.4 | 5 | 6 | 7.8 | 9.10 | | | | |
| 1 | | | | 31 | 0 | 1 | 2 | 3.4 | 5 | 6 | 7.8 | 9 | 10 | | |
| 2 | | | | 31 | 0 | 1 | 2 | 3.4 | 5 | 6 | 7.8 | 9 | 10 | | |
| 3 | D4 | D5 | D6 | C2.0 | 1 | 2 | 3.4 | 5 | 6 | 7.8 | 9.10 | | | | |
| 4 | | | | 31 | 0 | 1 | 2 | 3.4 | 5 | 6 | 7.8 | 9 | 10 | | |
| 5 | | | | 31 | 0 | 1 | 2 | 3.4 | 5 | 6 | 7.8 | 9 | 10 | | |
| 6 | D7 | D8 | D9 | G1.0 | 1 | 2 | 3.4 | 5 | 6 | 7.8 | 9.10 | | | | |
| 7 | V1 | | | 31 | 0 | 1 | 2 | 3.4 | 5 | 6 | 7.8 | 9 | 10 | | |
| 8 | | | | 31 | 0 | 1 | 2 | 3.4 | 5 | 6 | 7.8 | 9 | 10 | | |
| 9 | DA | DB | DC | F2.0 | 1 | 2 | 3.4 | 5 | 6 | 7.8 | 9.10 | | | | |
| 10 | | | | 31 | 0 | 1 | 2 | 3.4 | 5 | 6 | 7.8 | 9 | 10 | | |
| 11 | | | | 31 | 0 | 1 | 2 | 3.4 | 5 | 6 | 7.8 | 9 | 10 | | |
| 12 | Z1 | Z2 | E2 | H4.0 | 1 | 2 | 3.4 | 5 | 6 | 7.8 | 9.10 | | | | |
| 13 | | | | 31 | 0 | 1 | 2 | 3.4 | 5 | 6 | 7.8 | 9 | 10 | | |
| 14 | | | | 31 | 0 | 1 | 2 | 3.4 | 5 | 6 | 7.8 | 9 | 10 | | |
| 15 | A1 | A2 | C1 | Z3.0 | 1 | 2 | 3.4 | 5 | 6 | 7.8 | 9.10 | | | | |
| 16 | | | | 31 | 0 | 1 | 2 | 3.4 | 5 | 6 | 7.8 | 9 | 10 | | |
| 17 | | | | 31 | 0 | 1 | 2 | 3.4 | 5 | 6 | 7.8 | 9 | 10 | | |
| 18 | B1 | E1 | F1 | Z4.0 | 1 | 2 | 3.4 | 5 | 6 | 7.8 | 9.10 | | | | |
| 19 | | | | 31 | 0 | 1 | 2 | 3.4 | 5 | 6 | 7.8 | 9 | 10 | | |
| 20 | | | | 31 | 0 | 1 | 2 | 3.4 | 5 | 6 | 7.8 | 9 | 10 | | |
| 21 | D1 | D2 | D3 | Z5.0 | 1 | 2 | 3.4 | 5 | 6 | 7.8 | 9.10 | | | | |
| 22 | | | | 31 | 0 | 1 | 2 | 3.4 | 5 | 6 | 7.8 | 9 | 10 | | |
| 23 | | | | 31 | 0 | 1 | 2 | 3.4 | 5 | 6 | 7.8 | 9 | 10 | | |
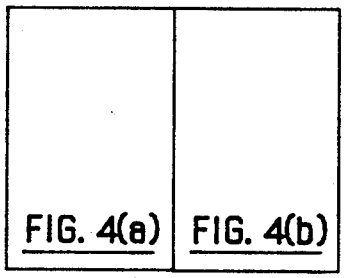
FIGURE 4
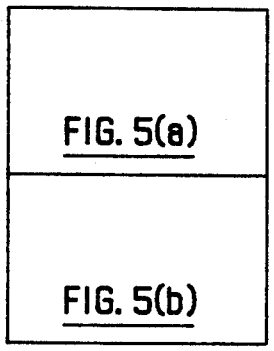
FIGURE 5
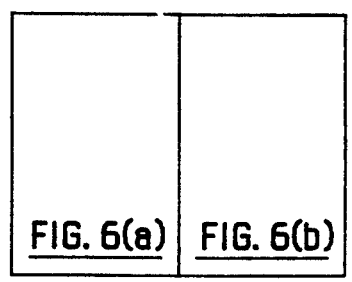
FIGURE 6

```
11  12 13 14 15  16 17 18 19  20 21 22 23  24 25 26 27
11. 12 13 14 15. 16 17 18 19. 20 21 22 23. 24 25 26 27
11. 12 13 14 15  16 17 18 19  20 21 22 23. 24 25 26 27
11. 12 13 14 15. 16 17 18 19. 20 21 22 23. 24 25 26 27
11. 12 13 14 15. 16 17 18 19. 20 21 22 23. 24 25 26 27
11. 12 13 14 15. 16 17 18 19. 20 21 22 23. 24 25 26 27
11. 12 13 14 15  16 17 18 19. 20 21 22 23. 24 25 26 27
11. 12 13 14 15  16 17 18 19. 20 21 22 23. 24 25 26 27
11. 12 13 14 15. 16 17 18 19. 20 21 22 23. 24 25 26 27
11. 12 13 14 15. 16 17 18 19. 20 21 22 23. 24 25 26 27
11. 12 13 14 15  16 17 18 19. 20 21 22 23. 24 25 26 27
11. 12 13 14 15. 16 17 18 19. 20 21 22 23. 24 25 26 27
11. 12 13 14 15  16 17 18 19. 20 21 22 23. 24 25 26 27
11. 12 13 14 15  16 17 18 19. 20 21 22 23. 24 25 26 27
11. 12 13 14 15. 16 17 18 19. 20 21 22 23. 24 25 26 27
11. 12 13 14 15  16 17 18 19. 20 21 22 23. 24 25 26 27
11. 12 13 14 15. 16 17 18 19. 20 21 22 23. 24 25 26 27
11. 12 13 14 15. 16 17 18 19. 20 21 22 23. 24 25 26 27
11. 12 13 14 15  16 17 18 19. 20 21 22 23. 24 25 26 27
11. 12 13 14 15  16 17 18 19. 20 21 22 23. 24 25 26 27
11. 12 13 14 15  16 17 18 19. 20 21 22 23. 24 25 26 27
11. 12 13 14 15. 16 17 18 19. 20 21 22 23. 24 25 26 27
11. 12 13 14 15  16 17 18 19. 20 21 22 23. 24 25 26 27
11. 12 13 14 15. 16 17 18 19. 20 21 22 23. 24 25 26 27
11. 12 13 14 15  16 17 18 19. 20 21 22 23. 24 25 26 27
11. 12 13 14 15. 16 17 18 19. 20 21 22 23. 24 25 26 27
11. 12 13 14 15  16 17 18 19. 20 21 22 23. 24 25 26 27
11. 12 13 14 15. 16 17 18 19. 20 21 22 23. 24 25 26 27
```
FIGURE 4(b)
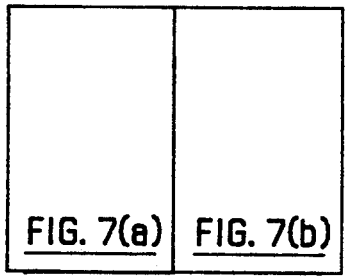
FIGURE 7
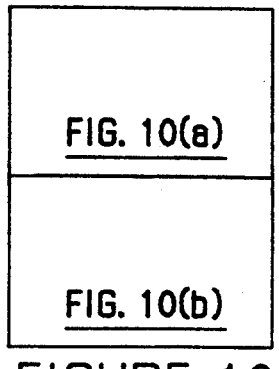
FIGURE 10
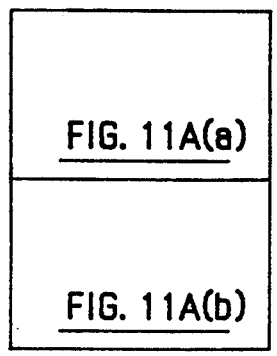
FIGURE 11A

| CHANNEL: | BIT: 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | | | | SYNC WORD | | | | | | | | | | | | P |
| 1 | | | POINTER | | | | | | A | B | C | D | V5 | | | P |
| 2 | | V5 | | | A | B | C | D | | | JBYTE | | | | | P |
| 3 | | A | B | C | D | | | CHANNEL 0 | | | | A | B | C | X | P |
| 4 | Y | X | X | | CHANNEL 1 | | | | A | B | C | D | | | | P |
| 5 | | | CHANNEL 2 | | | A | B | C | D | | | CHANNEL 4 | | | A | P |
| 6 | | CHANNEL 3 | | | A | B | C | D | | | CHANNEL 5 | | | A | D | P |
| 7 | | | A | B | C | D | | | CHANNEL 6 | | | A | B | C | D | P |
| 8 | | CHANNEL 8 | | | | | CHANNEL 7 | | | A | B | C | D | | A | P |
| 9 | B | C | D | | | | | | A | B | C | D | | | | P |
| 10 | | CHANNEL 8 | | | A | B | C | D | | | CHANNEL 10 | | | A | D | P |
| 11 | B | C | D | | | CHANNEL 11 | | | A | B | C | D | | | | P |
| 12 | | | | | | CHANNEL 12 | | | A | B | C | D | | | A | P |
| 13 | | CHANNEL 13 | | | A | B | C | D | | | CHANNEL 14 | | | | D | P |
| 14 | | | CHANNEL 13 | | | A | B | C | D | | | CHANNEL 14 | | | | P |

| ROW\COL | 28 | 29 | 30 | 31 | 0 | 1 | 2 | 3 | 4 | 5 | 6 | 7 | 8 | 9 | 10 | 11 |
|---|---|---|---|---|---|---|---|---|---|---|---|---|---|---|---|---|
| 24 | H1 | H2 | H3 | J1 | 0 | | | | V1 (V2, V3, V4) - PGEN ROW 33 | | | | | | | |
| 25 | | | | | 7 | | V5 (R, R, R) - PGEN ROW 34 | | | | | | | | | |
| 26 | | | | | 14 | | R (J1, J2, J3) | | | 20 | 0 | | | | | |
| 0 | B2 | K1 | K2 | B3 | 0 | | | | CHANNEL 1 - PGEN ROW 1 | | | | | | | |
| 1 | | | | | 7 | | CHANNEL 2 - PGEN ROW 2 | | | | | | | | | |
| 2 | | | | | 14 | | CHANNEL 3 | | | 20 | 0 | | | | | |
| 3 | D4 | D5 | D6 | C2 | 0 | | | | CHANNEL 5 - PGEN ROW 5 | | | | | | | |
| 4 | | | | | 7 | | CHANNEL 6 - PGEN ROW 6 | | | | | | | | | |
| 5 | | | | | 14 | | CHANNEL 7 | | | 20 | 0 | | | | | |
| 6 | D7 | D8 | D9 | G1 | 0 | | | | CHANNEL 9 - PGEN ROW 9 | | | | | | | |
| 7 | VI | | | | 7 | | CHANNEL 10 - PGEN ROW 10 | | | | | | | | | |
| 8 | | | | | 14 | | CHANNEL 11 | | | 20 | 0 | | | | | |
| 9 | DA | DB | DC | F2 | 0 | | | | CHANNEL 13 - PGEN ROW 13 | | | | | | | |
| 10 | | | | | 7 | | CHANNEL 14 - PGEN ROW 14 | | | | | | | | | |
| 11 | | | | | 14 | | CHANNEL 15 | | | 20 | 0 | | | | | |
| 12 | Z1 | Z2 | E2 | H4 | 0 | | | | CHANNEL 17 - PGEN ROW 17 | | | | | | | |
| 13 | | | | | 7 | | CHANNEL 18 - PGEN ROW 18 | | | | | | | | | |
| 14 | | | | | 14 | | CHANNEL 19 | | | 20 | 0 | | | | | |
| 15 | A1 | A2 | C1 | Z3 | 0 | | | | CHANNEL 21 - PGEN ROW 21 | | | | | | | |
| 16 | | | | | 7 | | CHANNEL 22 - PGEN ROW 22 | | | | | | | | | |
| 17 | | | | | 14 | | CHANNEL 23 | | | 20 | 0 | | | | | |
| 18 | B1 | E1 | F1 | Z4 | 0 | | | | CHANNEL 25 - PGEN ROW 25 | | | | | | | |
| 19 | | | | | 7 | | CHANNEL 26 - PGEN ROW 26 | | | | | | | | | |
| 20 | | | | | 14 | | CHANNEL 27 | | | 20 | 0 | | | | | |
| 21 | D1 | D2 | D3 | Z5 | 0 | | | | CHANNEL 29 - PGEN ROW 29 | | | | | | | |
| 22 | | | | | 7 | | CHANNEL 30 - PGEN ROW 30 | | | | | | | | | |
| 23 | | | | | 14 | | CHANNEL 31 | | | 20 | 0 | | | | | |

FIGURE 7(a)

| 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|
| | | | | | | | | 20 | 0 | | V5 (R, R, R) | | | | 6 |
| | 20 | 0 | | | R (J1, J2, J3) – PGEN ROW 35 | | | | | | | | | | 13 |
| | CHANNEL 0 – PGEN ROW 0 | | | | | | | | | | | | | | 20 |
| | | | | | | | | 20 | 0 | | CHANNEL 2 | | | | 6 |
| | 20 | 0 | | | CHANNEL 3 – PGEN ROW 3 | | | | | | | | | | 13 |
| | CHANNEL 4 – PGEN ROW 4 | | | | | | | | | | | | | | 20 |
| | | | | | | | | 20 | 0 | | CHANNEL 6 | | | | 6 |
| | 20 | 0 | | | CHANNEL 7 – PGEN ROW 7 | | | | | | | | | | 13 |
| | CHANNEL 8 – PGEN ROW 8 | | | | | | | | | | | | | | 20 |
| | | | | | | | | 20 | 0 | | CHANNEL 10 | | | | 6 |
| | 20 | 0 | | | CHANNEL 11 – PGEN ROW 11 | | | | | | | | | | 13 |
| | CHANNEL 12 – PGEN ROW 12 | | | | | | | | | | | | | | 20 |
| | | | | | | | | 20 | 0 | | CHANNEL 14 | | | | 6 |
| | 20 | 0 | | | CHANNEL 15 – PGEN ROW 15 | | | | | | | | | | 13 |
| | CHANNEL 16 – PGEN ROW 16 | | | | | | | | | | | | | | 20 |
| | | | | | | | | 20 | 0 | | CHANNEL 18 | | | | 6 |
| | 20 | 0 | | | CHANNEL 19 – PGEN ROW 19 | | | | | | | | | | 13 |
| | CHANNEL 20 – PGEN ROW 20 | | | | | | | | | | | | | | 20 |
| | | | | | | | | 20 | 0 | | CHANNEL 22 | | | | 6 |
| | 20 | 0 | | | CHANNEL 23 – PGEN ROW 23 | | | | | | | | | | 13 |
| | CHANNEL 24 – PGEN ROW 24 | | | | | | | | | | | | | | 20 |
| | | | | | | | | 20 | 0 | | CHANNEL 26 | | | | 6 |
| | 20 | 0 | | | CHANNEL 27 – PGEN ROW 27 | | | | | | | | | | 13 |
| | CHANNEL 28 – PGEN ROW 28 | | | | | | | | | | | | | | 20 |
| | | | | | | | | 20 | 0 | | CHANNEL 30 | | | | 6 |
| | 20 | 0 | | | CHANNEL 31 – PGEN ROW 31 | | | | | | | | | | 13 |
| | R – PGEN ROW 32 | | | | | | | | | | | | | | 20 |

FIGURE 7(b)

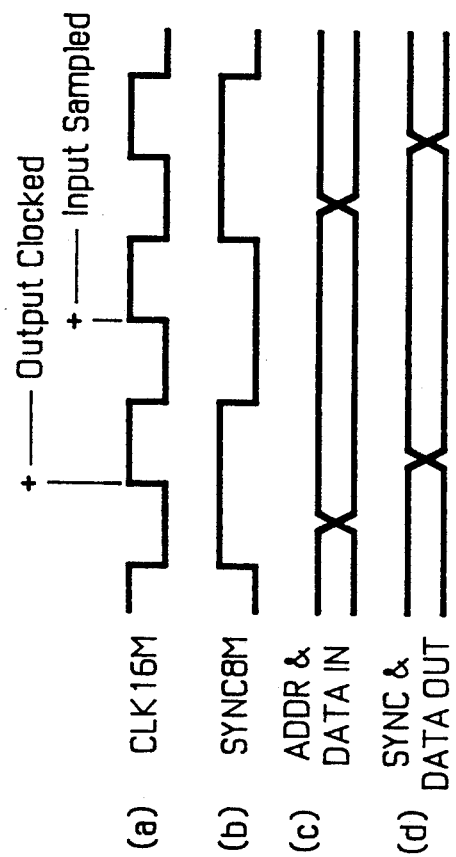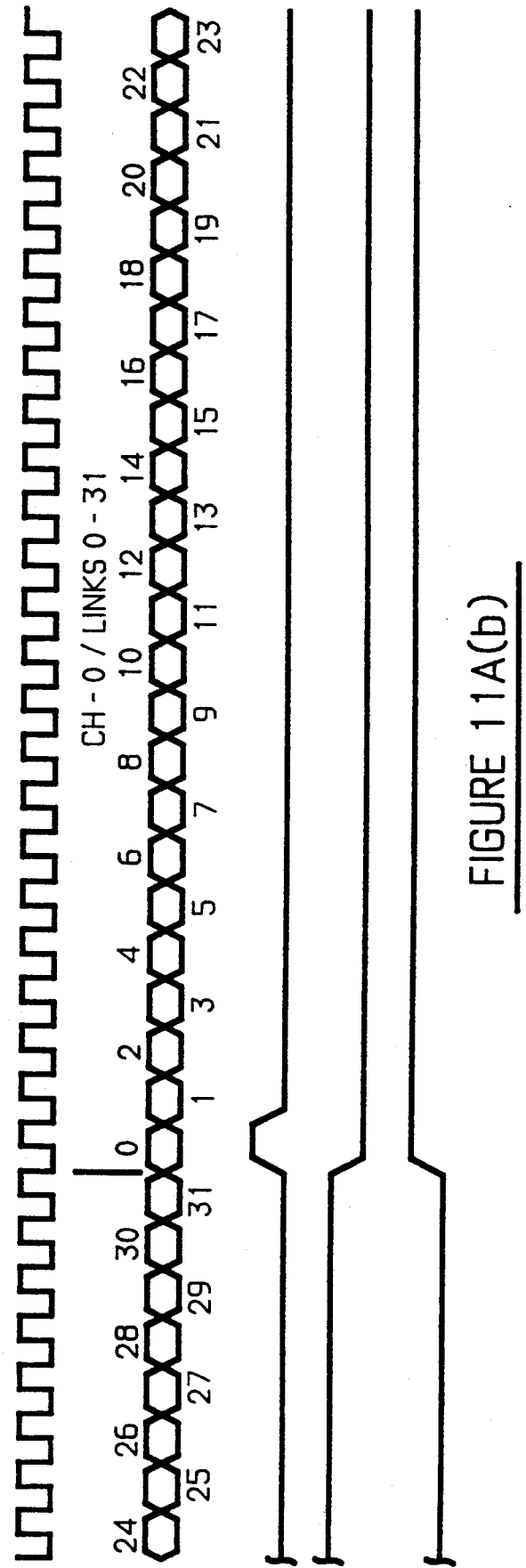
FIGURE 11B
FIGURE 11A(b)

| BIT # | 0 | 3 | 6 | 9 | 12 | 14 |
|---|---|---|---|---|---|---|
| | (ss = 0) | | | | (ss = 1) | |
| | Q0 | | | | Q11 Q0 | |
| | (ss = 1) | | | | (ss = 2) | |
| | | | | Q11 | Q0 | |
| | (ss = 2) | | | (ss = 3) | | |
| | | | Q11 | Q0 | | |
| | ss=3 | | (ss = 4) | | | |
| | Q11 Q0 | | | | | Q11 |

Upper
Lower
Upper
Lower

Q0 = Bit 0 of the reformatted 12 bit word
Q11 = Bit 12 of the reformatted 12 bit word
ss = Multiplexer select state

FIGURE 13

| BIT # | 0 | 3 | 6 | 9 | 12 | 14 |
|---|---|---|---|---|---|---|
| | | | | (ss = 1) | | |
| | U0 | | | | U11 L0 | L2 |
| | | | | (ss = 2) | | |
| | U3 | | | U11 | L0 | L5 |
| | | | (ss = 3) | | | |
| | U6 | U11 | L0 | | | L8 |
| | | (ss = 0) | | | | |
| | U9 U11 L0 | | | | | L11 |

Ux = x bit read from the SM
Lx = x bit read from the SM
ss = Multiplexer select state

FIGURE 16

METHOD AND APPARATUS FOR TRANSLATING DIFFERENTLY-SIZED VIRTUAL TRIBUTARIES ORGANIZED ACCORDING TO A SYNCHRONOUS OPTICAL NETWORK (SONET) STANDARD

TECHNICAL FIELD

The present invention relates to digital communications and, more particularly, to high speed telephony.

BACKGROUND OF THE INVENTION

A serial transport frame format method was previously disclosed in U.S. Pat. No. 5,060,229 to Tyrrell et al. That format method involves interfacing a high speed parallel bus and a low speed serial bus in a network element that receives and sends high speed signals from and to similar network elements and that further switches low speed signals to and from the network. The switching matrix in the network element is responsive to high speed signals from two different directions and passes on some of those high speed signals to other network elements. It also switches others of the high speed signals down to local subscribers at a lower speed. Similarly, local subscribers provide low speed serial multiplexed DS-1 signals to the network element which in turn switches some or all of such signals on to the high speed busses for transmission to other network elements. In the network element disclosed in the above cited U.S. Patent, an internal serial transport frame format is described which is used to transfer data between the switching matrix and a plurality of serial bus interface modules. Each of these provide a number of DS-1 signals to a corresponding number of asynchronous modules for further decomposition or construction, respectively, into or from even lower speed DS-0 signals, corresponding to individual subscribers, each operating serially at 64 Kb/s. The DS-1 interfaces can incorporate up to 24 DS-0 channels and operate at the electrical telephony standard of 1.544 Mb/s. The signals between the serial bus interfaces and the switching matrix operate at about 8.192 MHz. The signals used to interface between network elements are operating at even higher speeds, e.g., 51.84 Mb/s (STS-1) and higher, according to ANSI standard T1.105 entitled "Digital Hierarchy Optical Interface Rates and Formats Specification". An STS-1 frame is shown in FIG. 1. The frame repetition rate is 8 kHz. The frame contains one byte of voice data from a large number of subscribers depending on how many bytes in the STS-1 SPE are used for non-voice purposes. For example, in the U.S., there are 672 bytes used of the 756 available in the SPE.

The serial transport frame format disclosed in the above mentioned U.S. patent defines a frame for the transfer of 32 channels of information between the switch matrix and each of the 28 DS-1 links on the other side of the serial bus interfaces. Each channel comprises 16 bits (8 data bits) and each frame is generated at a selected frequency of, e.g., 4.096 MHz. As may be seen in FIG. 2, a first portion of each channel contains the voice data while a second portion of the same channel contains associated control information., Each channel comprises 16 bits represented on 16 wires between the switching matrix and the serial bus interface. The control information may include timing information associated with that channel of data.

When the channels contain DS-0 data, the first 8 bits of each 16 bit channel contains the actual DS-0 data (such as voice data) with the remaining bits containing the signalling information (e.g., A, B or A, B, C, D information) and timing information associated with that DS-0, channel as well as channel parity information.

To facilitate the transport of lower rate digital signals, the SONET standard uses sub-STS-1 payload mappings, referred to as Virtual Tributary (VT) structures. There are currently 4 sizes of VT as shown in FIG. 3. This mapping divides the SPE frame of FIG. 1 into 7 equal sized subframes or VT blocks with 12 columns (108 bytes) in each. Thus, the subframes account for (7) (12)=84 columns with the path overhead column and 2 unused columns (reserved bytes R) accounting for the remainder of the 87 columns in an SPE. The rate of each VT structure is determined as (108) (8) (8,000)=6.912 megabits/s.

The VT structure described above is designed to facilitate consistent transport and switching of various payloads uniformly by handling only VTs. All services below the DS-3 rate are transported within a VT structure.

A VT group of 12 columns can be individually assigned to carry one of the four types of signals shown in FIG. 3. Depending on the data rate of the particular VT type, more than one signal may be carried in a 12 column VT structure as a VT group. Thus, the VT1.5 type group can carry four VT1.5s in a 12 column VT group. Similarly, three VT2.0s can be carried in a VT2 type group. Only two VT3.0s and only one VT6.0 can be carried in a group. When all seven VT groups in an envelope are VT1.5s, a total capacity of 28 DS-1's is provided-the same as a DS-3 signal. This approach is attractive in that the virtual tributaries are individually accessible for cross connect or add/drop multiplexer systems.

For VT1.5 groups, the serial transport frame format shown in FIG. 2 is conveniently designed to accommodate 24 DS-0's in channels 4-27 while the remaining channels are used for internal management purposes or are not assigned. One such frame thus accommodates one DS-1 signal and is called a link. There may be seven such links between each of, e.g., four serial bus interfaces and the switching matrix. Altogether, there will thus be 28 DS-1 links between the switching matrix and the serial bus interfaces. Additional links may also be added for control purposes, e.g., "VI".

The serial transport frame format of the above mentioned U.S. patent is particularly well suited to be used for transporting the VT1.5 size virtual tributary. There was a possibility, however, that we could adapt hardware designed for that format to other virtual tributary sizes, such as VT2, which might be desirable for application in countries in which that format is used.

DISCLOSURE OF INVENTION

An object of the present invention is to translate virtual words in one format to virtual words in another format.

According to the present invention, virtual words in one format may be translated to virtual words in another format by encode/decode means, responsive to data signals of a second/first VT size, for providing the data signals as data formatted for the first/second VT size.

In still further accord with the present invention, the reformatter means further includes a receive/transmit memory, for storing a last two successive of the outgoing/incoming data signals and multiplexer means, responsive to the last two successive stored data signals of the second/first VT size for providing the last two successive stored data signals.

According further to the present invention, virtual tributaries of one size can be translated for interpretation according to a method for interpreting virtual tributaries of another size.

A high speed interface designed to interface with a defined VT size may address map the data for transport in a regular fashion dictated by the size of the VT expected. For example, for a VT1.5 size, row and column addresses may be assigned for individual subscribers' data in a 32×27 matrix such as shown in FIGS. 4(a) and 4(b) which fit together as shown in FIG. 4. Such a stored matrix is used to provide or receive data to or from a switching matrix in the network element according to a mapping function corresponding to the above described row and column mapping. The information thus mapped can be transported through the matrix entirely on high speed busses for inter-network transport or may be transported in either direction to or from the low speed busses for local interface.

The above described U.S. Pat. No. 5,060,229 describes an architecture designed to operate specifically on a VT1.5 STS-1 SPE. The add/drop multiplexer shown in FIG. 3 thereof illustrates DS-1 serial busses 48. The time slot multiplexer 52 shown therein uses the serial transport frame format shown in FIG. 8 thereof and in FIG. 2 hereof for the transfer of data and associated control information internally between a switch and plurality of serial bus interface modules.

In that architecture, the high speed bus interface row and column mapping is naturally setup in a regular fashion as is shown in FIGS. 4(a) and 4(b). There, the 28 DS-1 channels are mapped into columns 0-27 by means of 28 corresponding VT1.5s. The other 4 columns 28-31 come about as a result of incoming overhead bytes. The 24 individual subscribers in each DS-1 column may thus be identified, according to the map, in one of the rows 0-23. Thus, the map of FIGS. 4(a) and 4(b) represents 672 pigeonholes (24×28) each of which represents a subscriber. The other pigeonholes are used for control purposes.

The problem with the architecture as described above is that it does not easily lend itself to mapping of high speed signals in anything other than the VT1.5 format. Thus, the problem presented is how to use the architecture for interfacing with VT's having sizes different than that of the of VT1.5 size. Or, more generally, the problem may be stated as how to translate virtual words in one format to virtual words in another format.

For example, assuming one would wish to modify the above described architecture to handle a VT2 STS-1 SPE, i.e., using an architecture originally designed to handle VT1.5s, we teach a method of representing the channels in one format in a way that would be easily encoded and decoded into the other format. For example, we devised a method of representing 36 12-bit channels in a transport frame designed for 27 16-bit channels that would be easily encoded and decoded in hardware. In the VT1.5 case, the 27 16-bit channels were originally assigned one per SBI channel for the first 27 channels of the SBI frame, as shown in FIG. 2. For the VT2 case, the 36 12-bit channels are "packed" into 29 16-bit SBI channels, as shown in FIGS. 5(a) and 5(b) which fit together as shown in FIG. 5. We call this the SBI-E format.

In FIGS. 6(a) and 6(b), which fit together as shown in FIG. 6, a block diagram is shown of an architecture similar to that presented in FIG. 3 of U.S. Pat. No. 5,060,229 except modified to use a TSM-E switching matrix 10a, 10b and a plurality of 2 Mb/s interfaces 12 interconnected by a corresponding plurality of 2 Mb/s serial busses. Thus, if there are 21 2 Mb interfaces, there are 21 corresponding serial links.

Only the TSM-E matrix and the 2 Mb interfaces need be modified. Everything else is allowed to remain the same. By virtue of the nature of the high speed signals changing from VT1.5 to VT2, the incoming VT2 signals are mapped into the same size (27×32) map but the representation of the data is very different, as shown in FIGS. 7(a) and 7(b) which fit together as shown in FIG. 7. Thus, there is a need for the TSM-E matrix to interpret the interface in a completely different manner. Also, the speed has to change from 1.5 to 2 MHz. However, the basic structure of the internal TSM interface in the serial frame transport of FIG. 2 need not change.

These are the general outlines of the present invention to be described in more detail below in connection with a best mode embodiment thereof, as further illustrated by the drawing.

BRIEF DESCRIPTION OF THE DRAWING

FIG. 4 shows how FIGS. 4(a) and 4(b) fit together to form an illustration of a regularized VT1.5 mapping by which individual subscribers may be easily identified by row and column.

FIG. 5 shows how FIGS. 5(a) and 5(b) fit together to form an illustration of a serial transport frame format similar to FIG. 2, except modified for transporting a VT2 size virtual tributary.

FIG. 7 shows how FIGS. 7(a) and 7(b) fit together to form an illustration of how a map of the same size as shown in FIGS. 4(a) and 4(b) for mapping VT1.5s may be interpreted for interpreting VT2s mapped using the same high speed interface hardware as used for VT1.5s.

FIG. 10 shows how FIGS. 10(a) and 10(b) fit together.

FIG. 9 and FIGS. 10(a) and 10(b) show an EMUX ASIC 62 of a TSM-E 10a such as shown in FIG. 8 in detail; shaded elements in FIGS. 9, 10(a) and 10(b) are common while FIG. 9 shows the add direction and FIGS. 10(a) and 10(b) the drop direction.

FIGS. 11A(a) & 11A(b) and 11B show several waveforms associated with FIGS. 9, 10(a) and 10(b).

FIG. 13 shows the various select states for the add reformatter multiplexer of FIGS. 9 and 12.

FIG. 16 shows select states for the drop formatter of FIGS. 10(a) and (b), FIG. 15 and FIGS. 17(a) and (b).

BEST MODE FOR CARRYING OUT THE INVENTION

Figures 1, 14, 17:
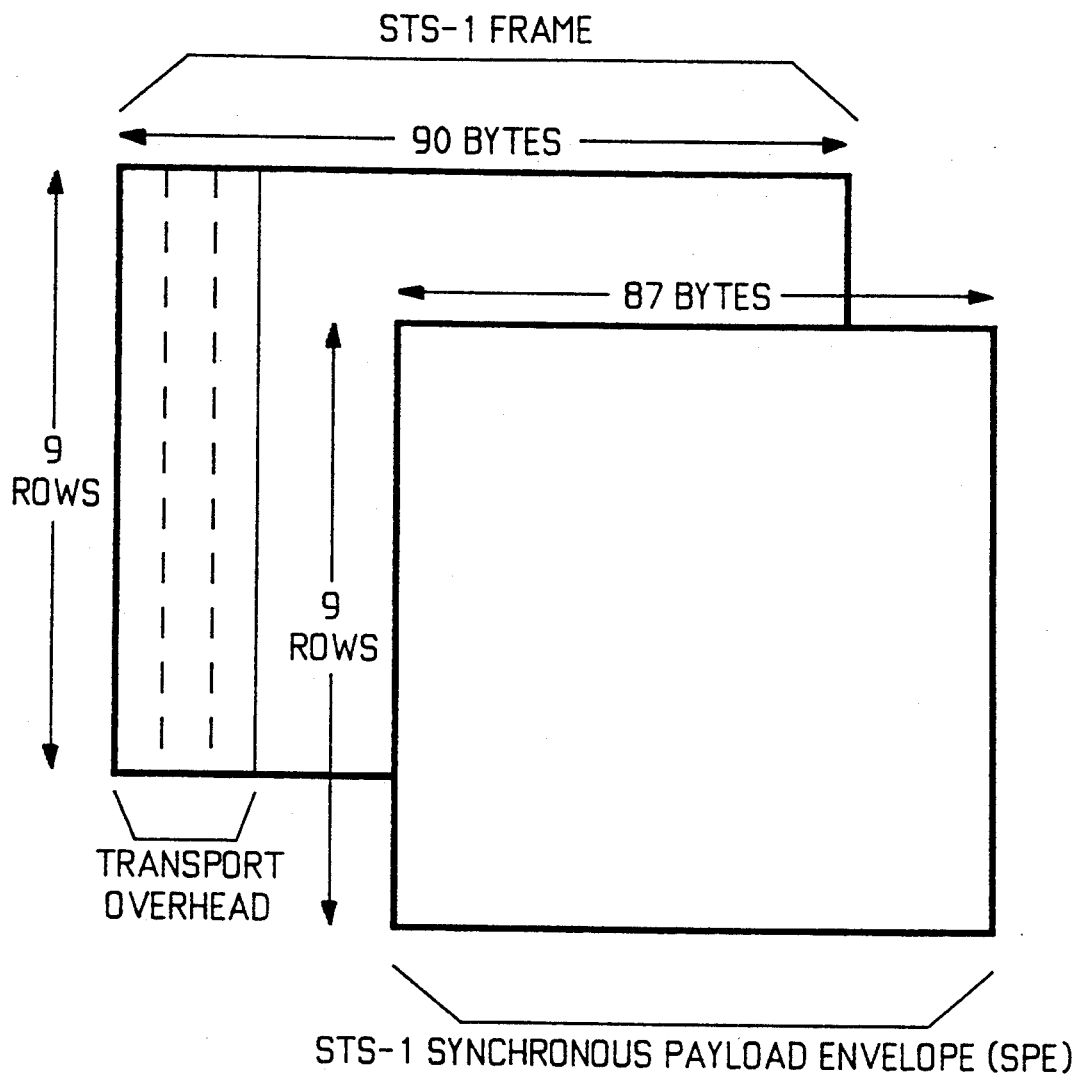
FIG. 1 is an illustration of a STS-1 frame, according to the prior art ANSI standard T1.105 for telecommunications defining a digital hierarchy for optical interface rates and formats as shown in FIG. 6 thereof.
FIG. 14 shows how FIGS. 14(a) and 14(b) fit together to show the multiplexer of FIG. 12 including the bit inputs from the upper (U) and lower (L) memories which, provide the 12-bit output according to the select states of FIG. 13.
FIG. 17 shows how FIGS. 17(a) and 17(b) fit together to show the multiplexer of FIG. 15 in detail.
Figure 2:
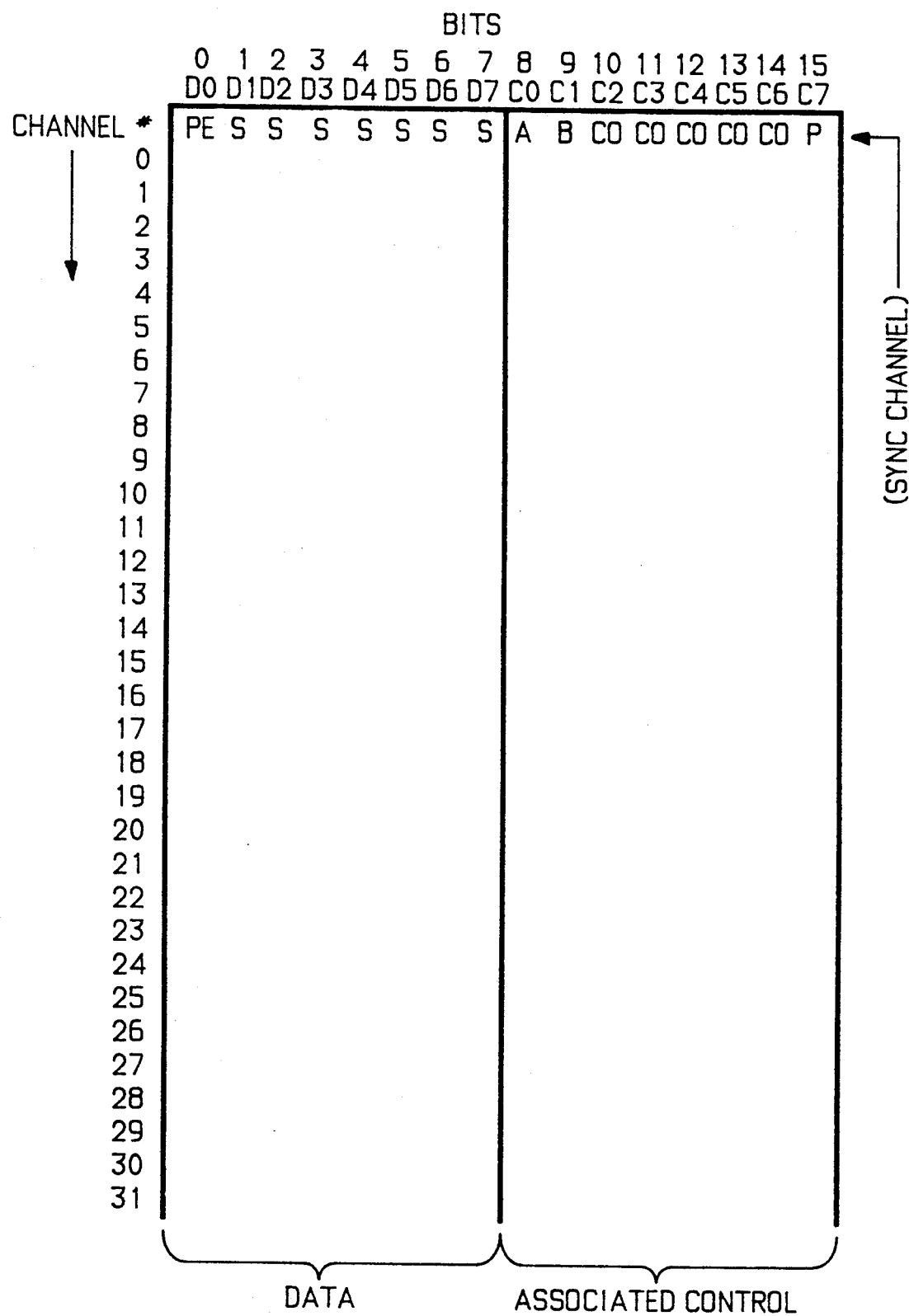
FIG. 2 is an illustration of a serial frame format for VT1.5 size tributaries as disclosed in U.S. Pat. No. 5,060,229, as shown in FIG. 8 thereof.
Figure 3:
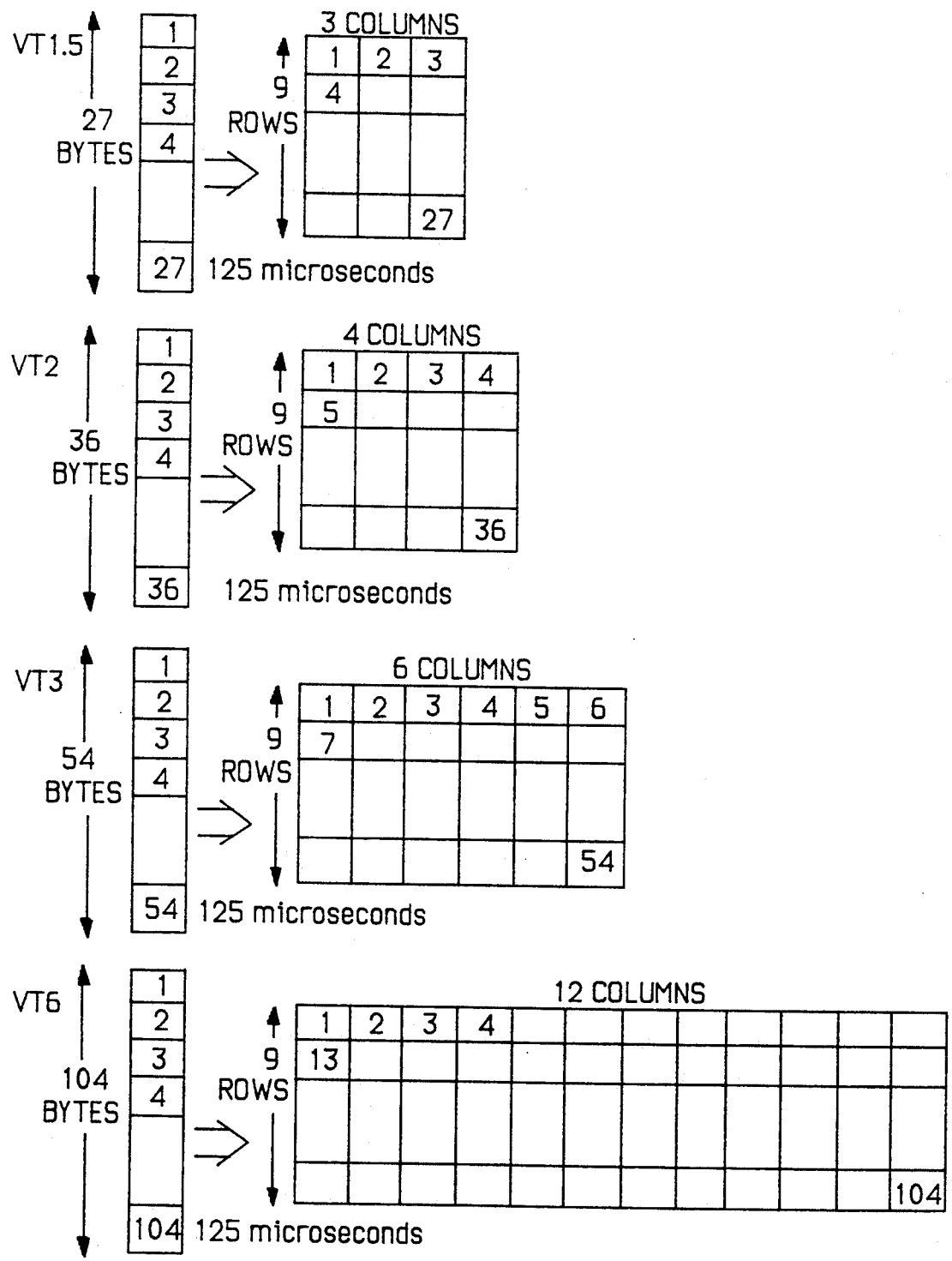
FIG. 3 is an illustration of virtual tributary sizes as described in FIG. 9 of the above mentioned ANSI specification T1.105.
Figure 6A:
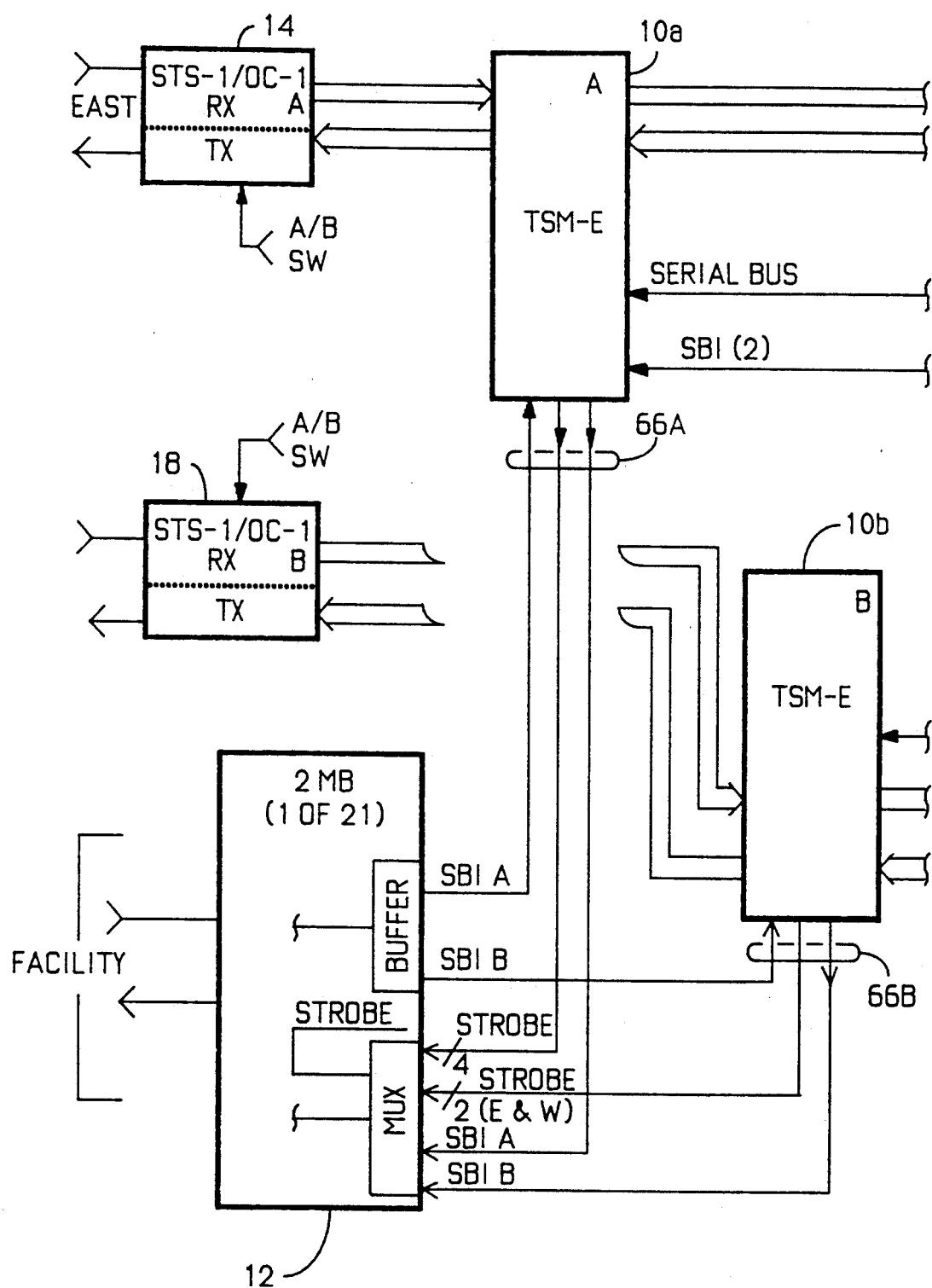
FIG. 6 shows how FIGS. 6(a) and 6(b) fit together to form an illustration of an add/drop multiplexer such as shown in FIG. 3 of U.S. Pat. No. 5,060,229, except modified to interface with virtual tributaries of size VT2.
Figure 6B:
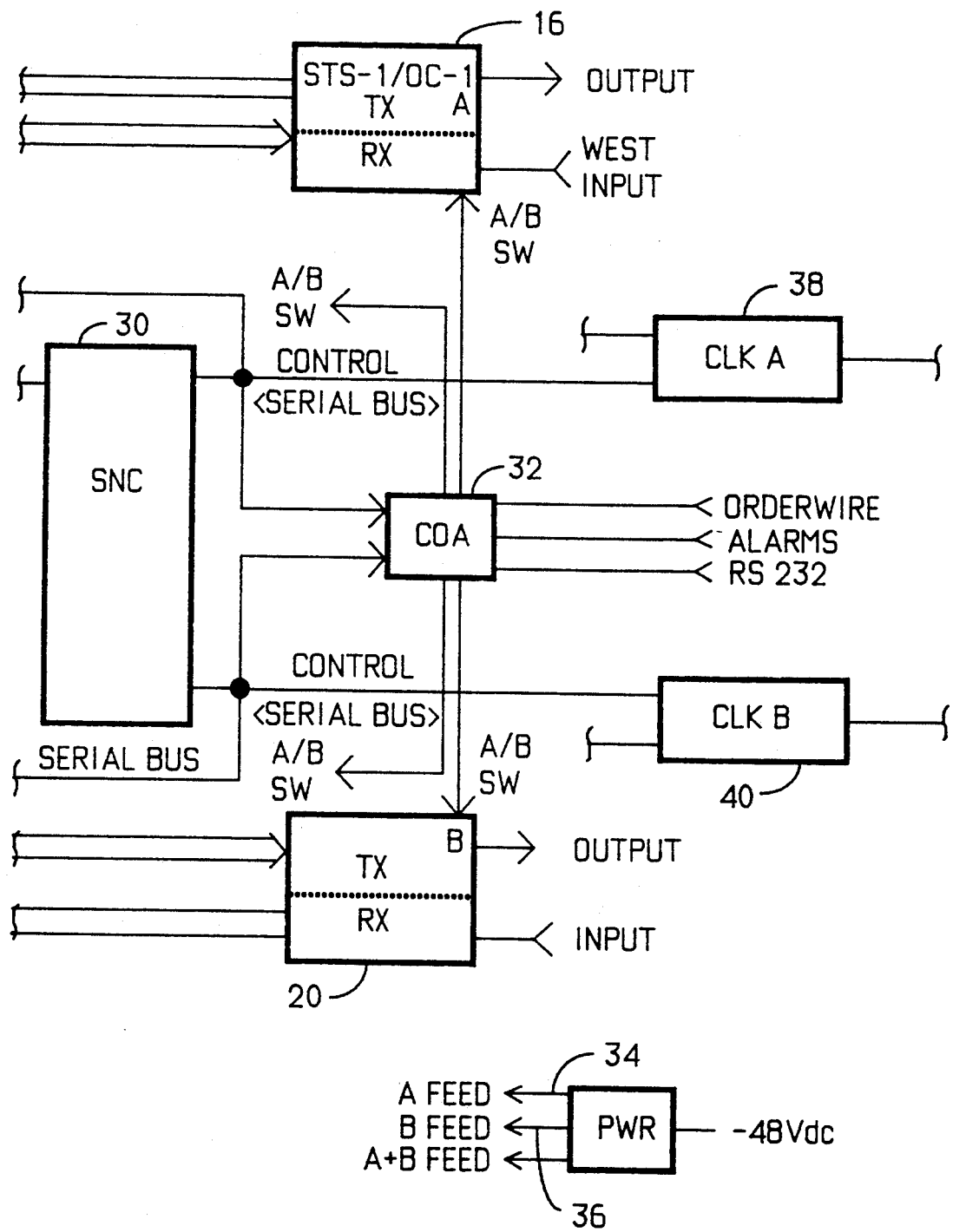
Figure 8:
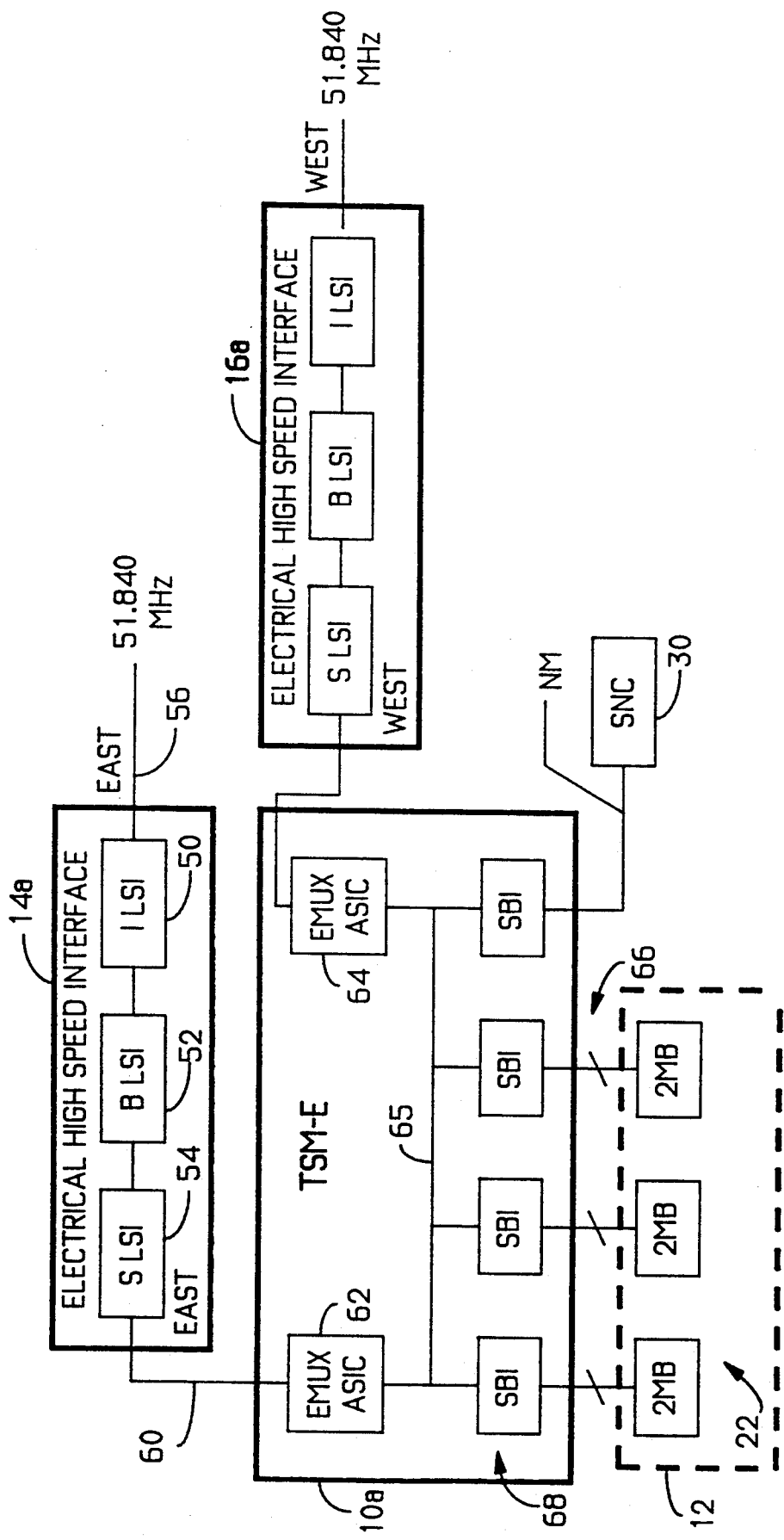
FIG. 8 is an illustration of one 10a of the time slot multiplexers (TSM-E) 10a, 10b of FIGS. 6(a) and 6(b) interfaced with a pair of electrical high speed interfaces 14a, 16a which may be identical to or a part of the interfaces 14, 16 as shown in FIGS. 6(a) and 6(b). Other high speed interfaces 18, 20, as shown in FIGS. 6(a) and 6(b), may also interface to the other TSM-E 10b, although same are not shown in FIG. 8 for simplicity. In addition to the electrical high speed interfaces 14a, 16a a plurality of asynchronous 2 Mb low speed interfaces 22 are shown connected to the TSM-E 10a. Although only three 2 Mb interfaces are shown in FIG. 8, it should be realized that there may be a large plurality of such interfaces such as the 21 2 Mb interfaces included in the asynchronous interface 12.

As mentioned above, the add/drop multiplexer shown in FIGS. 6(a) and (b) is similar to the add/drop multiplexer of U.S. Pat. No. 5,060,229 but is equipped with asynchronous 2 Mb low speed interfaces 12 and a modified time slot multiplexer 10 such as described hereinafter. The add/drop multiplexer of FIGS. 6(a) and 6(b) consists of redundant east 14, 18 and west 16, 20 high speed ports (51.84 MHz/s) equipped with electrical (STSX-1) interfaces 14a. The low speed ports of the TSM-E may be connected with 1 to 21 "floating VT2" asynchronous 2 Mb interfaces 22. In FIG. 8, the SBI ASICs 68 are connected to the EMUX ASICs 62, 64 via a sixteen bit bus 65 which is multiplexed between, e.g., 21 serial lines 66. The TSM-E 10a also provides the communication path (NM) for provisioning and alarms from the high speed and low speed interfaces to a controller 30. The controller monitors the system performance and provides A/B switch status information to a craft/order wire/alarm (COA) unit 32 as shown in FIGS. 6(a) and 6(b). The COA unit 32 monitors the A and B sides and determines which side should be active. The A and B sides are "bank" switched, i.e., each side consists of a power supply 34, 36, clock 38, 40, time slot mux 10a, 10b, the high speed east interfaces 14, 18 and the high speed west interfaces 16, 20. The 2 Mb interfaces, controller and COA are not redundant and have both A and B sides. The COA also provides the craft, order wire, alarm interfaces, and the non-volatile status and provisioning memory used by the add/drop multiplexer controller 30.

The add/drop multiplexer of FIGS. 6(a) and 6(b) has the capability to route any of the 21 VT2s located in the SONET payload, east or west, to any one of the 2 Mb low speed interfaces. The grooming (routing) may be provisioned from the local craft port remotely from a modem, or by a remote craft feature via the D1-D3 Data Com channel embedded in the SONET overhead.

High Speed to Low Speed Interface

The electrical high speed interface 14a provides the interface between the STS-1 rate signal on a line 56 and the TSM-E parallel bus interface 60. As shown, the high speed interface unit 14a may contain 3 Application Specific Integrated Circuits (ASICs): an "I" ASIC 50, an "B" ASIC 52, and a "S" ASIC 54. An incoming high speed (51.840 MHz) signal on the line 56 enters the high speed interface 14a where the data is retimed with a recovered clock. The signal is then sent to the "I" ASIC 50 where the signal is converted serial to parallel (a 6.48 MHz parallel signal is provided with a width of 8 bits; thus, serial/parallel conversion results in 51.84/8=6.48 MHz), B3ZS decoded, framed on, descrambled and B1/B2 BIP counts taken. The BIP counts are placed in robbed overhead positions. The signal then enters the "B" ASIC 52 where the 6.48 MHz parallel signal is buffered. In the buffer read operation, the "B" ASIC inserts gaps to change the signal rate from 6.48 MHz to 8.192 MHz. Wander and jitter are also removed during this operation. "B3" BIP is then calculated, compared and a "B3 error" flag sent to the "B" ASIC transmit function (G1). The received G1 data is monitored and sent to the "S" ASIC 54 in unused overhead bytes. The filtered line yellow remote alarm, loss of signal and a loss of clock inputs are monitored and sent in unused overhead bytes to the "S" ASIC 54. The signal is then sent to the "S" ASIC 54 where the addresses and parity are generated for the TSM-E parallel bus. All status information from the unused overhead bytes (from STS1I/STS1B ASICs) is stored/converted to VI channel data. The parallel bus data/address information is then sent to the TSM-E as symbolized by a signal on a line 60.

The TSM-E 10 contains two mux ASICs 62, 64 to interface to the east and west parallel busses of FIGS. 6(a) and (b). The TSM-E mux ASICs 62, 64 are also interfaced to 4 SBI ASICs by means of the SBI links 65 shown in FIG. 8 within the TSM-E 10a. The SBIs convert parallel data on the SBI bus 65 to serial data on lines 66. Both FIGS. 6(a) and 6(b) and 8 show serial links 66. These may be embodied, e.g., as 7 serial lines extending from each SBI ASIC of three SBI ASICs as shown in FIG. 8 to 21 separate 2 Mb interfaces.

The mux ASICs 62, 64 convert the VT1.5 row and column address to VT2 row and column address. A provisionable connect memory, to be disclosed in more detail below, produces the output address (VT2 cross connection function). The data is truncated to 12 bits (8 bits data, 4 bits signalling), VI channel and other information added (H4, etc.), before entering SBI LSI devices 68. These SBI ASICs 68 convert the parallel data to serial data, generate parity, pass A/B status, send TFIN for transmit H4, and pass the data to a serial SBI link 66.

Each of the 2 Mb/s ASICs is required to provide the floating, bit synchronous and 2 Mb/s interface function. Each 2 Mb ASIC 22 frames on an associated one of the SBI signal 66, locates the VI channel and performs the write operations. V1-V4, V5 are located using the receive H4 signal embedded in the SBI link. The VT pointer (V1-V4) and the clock 38, 40 control the write operation into a payload buffer (not shown). A fractional bit leaking desynchronizer (not shown) controls the read of the payload buffer. The buffer output is sent to a 2.048 Mb/s interface labelled "FACILITY" in FIGS. 6(a) and 6(b) where the bipolar output operations (HDB3) and line driver functions are performed.

Low speed to High speed Interface

In the reverse direction, the local 2.048 Mb/s signals enter the 2.048 Mb/s interface 22. The 2 Mb interface performs rate conversion, the bipolar operations (HDB3, BPV), detects loss of signals, detects all "1s" (AIS), and provides the status to the VI channel. The received data is read into a buffer using the recovered clock. A VT-2 bit stuffing algorithm is performed using a near full/near empty buffer status and transmit H4 signal embedded in the receive SBI link as TFIN. The payload, V5 byte, fixed VT pointer BIP-2/FEBE are added to form a complete VT2. The transmit VI channel is also added to the SBI output.

The incoming signal is then routed on a serial link 66 to an SBI ASIC. It is then inserted into a channel of the frame of FIGS. 5(a) and 5(b) for transmittal to the TSM-E 10. The SBI ASIC 68 selects the clock phase, performs frame synchronization, serial to parallel conversion, parity checking and channel address decoding.

The mux ASIC 62, 64 uses the input address and provisionable connect memory (shown below) to produce the VT output address. The data is converted from serial 12-bit words to parallel 16-bit words. The VT2 row and column address are converted to VT1.5 row and column address. The VI channel is extracted and placed into a buffer. The buffer outputs from all VT2 SBI's are combined, SBI formatted, and routed to the controller 30.

The TSM-E's parallel bus output 60 is connected to the electrical high speed interface 14a and enters "S" ASIC 54. The VI channel from the controller to the B and I ASICs 52, 50 is extracted from the parallel bus 60. The signal is stored, decoded and the VI data is placed in unused overhead (OH) bytes. Parity is checked against per channel parity generated on incoming channels. The data is then reformatted from the parallel bus to the SONET format. The parallel data is passed on to the B ASIC 52 where "B3" is calculated/inserted in the path overhead, G1 is constructed from received B3 errors and VI channel data (yellow remote alarm, etc.) and G1 is inserted into the overhead. The 8.192 MHz bus is passed on to the I ASIC 50. The I ASIC buffers the data, overrides A1/A2, overrides C1, calculates/inserts B1/B2, generates H1/H2 pointer, performs scrambling, B3ZS encoding, and parallel to serial conversion before leaving the electrical high speed interface as an outgoing signal on the line 56.

As may be seen from the foregoing, the high speed sides of the mux ASICs 62, 64 are interfaced to the high speed parallel address and data busses. A high speed interface device 14a designed to use the standard U.S. VT1.5 format was used but provisioned each of the 28 VT's (size VT2) into transparent (bit synchronous-/asynchronous) mode. This results in the high speed interface mapping through all necessary bytes from the SONET frame for 21 VT2s. The addressing remains as 27 row by 32 column format (5 bits+5 bits) as for VT1.5 as shown in FIGS. 7(a) and 7(b). The overhead is in columns 28-31 as in FIGS. 4(a) and 4(b). This means that the mux ASICs had to perform an address translation on the VT1.5 addressing and also needed their own VT2 counter.

The strategy for the realization of such a mux ASIC may therefore be to use, for example, the design of the mux ASIC of the above mentioned U.S. Pat. No. 5,060,229, as further disclosed in, for example U.S. Pat. No. 5,014,268 to Tyrrell et al wherein a parallel time slot interchanger matrix and switch block module for use therewith is disclosed, with minimal modification. This involves having the switch handle SBI's containing VT2 payload as if they contained VT1.5 payload as shown in FIGS. 5(a) and (b) and 7(a) and (b). This is possible because the frame alignment and VI channels are in the same positions and the remaining channels may be switched as a group as per the SONET standard. It is only necessary, for an embodiment going from VT1.5 to VT2 hardware, to increase volatile memory buffering from 27 channels per SBI to 30 channels per SBI since the assignee's mux ASIC for U.S. purposes only connects channels 1-27. The special connectivity provided for SBI's 29-31 may therefore remain virtually unchanged in such a new mux ASIC.

Figure 9:
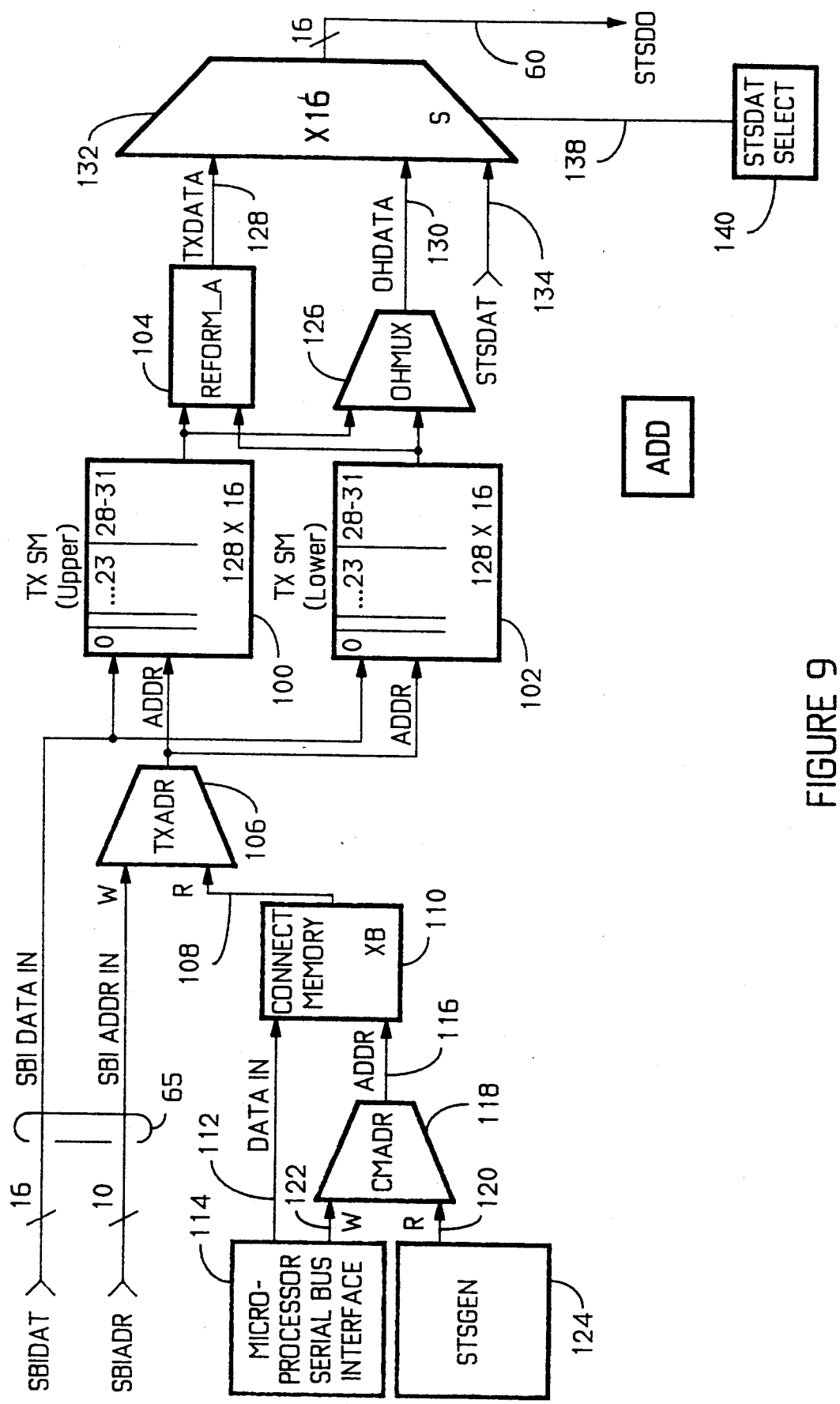

For the add direction, after the switch block, a new block 104 in FIG. 9, is needed to convert from the VT2 packed format (29 by 16 bits) to unpacked format (36 by 12 bits). This block involves buffering between packed format where logical words may be spread over two physical words and the standard format where each logical word has a fixed mapping into a physical word. A block diagram of this function in both the drop and add directions is shown in FIGS. 9 (ADD) and FIGS. 10(a) and 10(b) (DROP). Although not implemented by us, the format conversion function of these blocks and VT2 address generation could be made able to be switched off so that the device might be used in future U.S. VT1.5 applications.

The mux ASICs 62, 64 of FIG. 8 provide the data multiplexing functions between asynchronous transport signal level 1 (STS-1) interface 14a and a serial bus interface (SBI) 68. Both of the high speed interface bus 60 and SBI interface bus 65 consist of 16 parallel data bits and 11 address bits (including one synchronization bit). The configuration of FIG. 8 shows 2 mux ASICs used in an add/drop multiplexer device but may be used singly in a terminal multiplexer device.

The add section is configured to provide various functions as shown in detail in FIG. 9. At this point, the 16 bit input data and a 10 bit address input on the SBI busses 65 from the SBI ASICs 68 is running at twice the frequency of the received links 66. Thus, we are able to input the data into alternating ones of an upper 100 and lower 102 portion of a switch memory for every other channel at the same effective speed as the links 66. During an alternating read operation, both banks are read simultaneously and thus 2 consecutive channels of 16 bit data are latched by a pair of latches in a reformatter A104 as shown in more detail in FIG. 12. Depending on the row address to be read out, the reformatter mux 104 selects the appropriate combination of 12 bits from the 2 latched channels.

Figure 12:
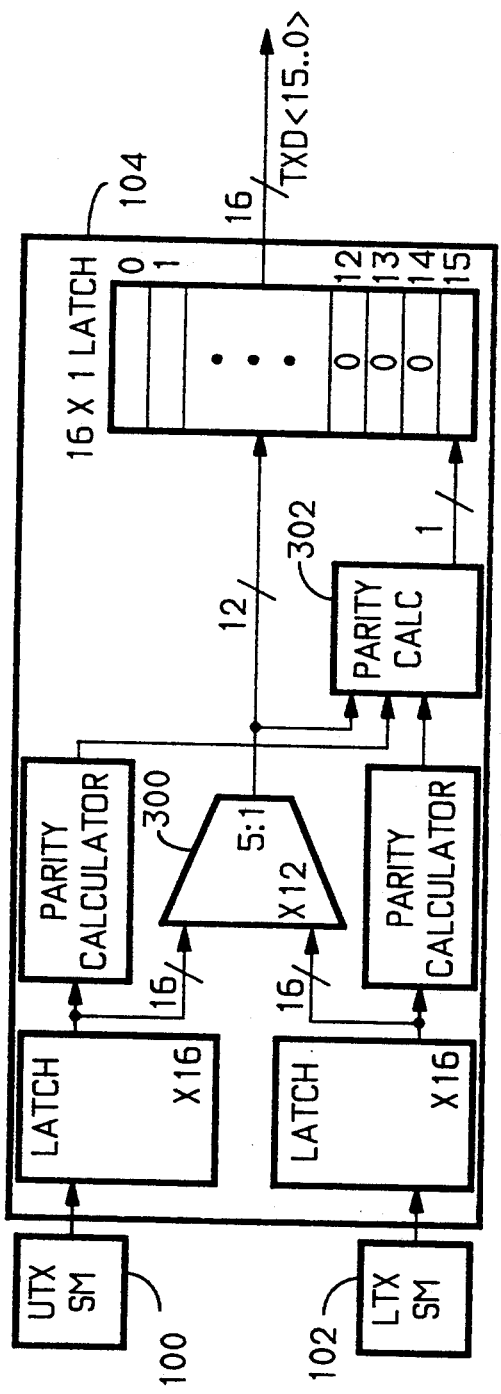
FIG. 12 shows the add reformatter of FIG. 9 in detail.

FIG. 12 shows the add reformatter of FIG. 9 in detail. This block performs the following 3 primary functions:

1. Calculates the parity of the 2 SBI words read from the upper and lower memories 100, 102.
2. Extracts the proper VT2 channel from the 2 SBI words read from the upper and lower memories.
3. Calculates the parity of the extracted VT2 channel.

An add reformatter multiplexer block 300, multiplexes two 16 bit channels read from the upper and lower transmit memories 100, 102 into one 12 bit channel. The proper 12 bit VT2 channel is selected by using the row value which was used to read the transmit memories.

Figure 14A:
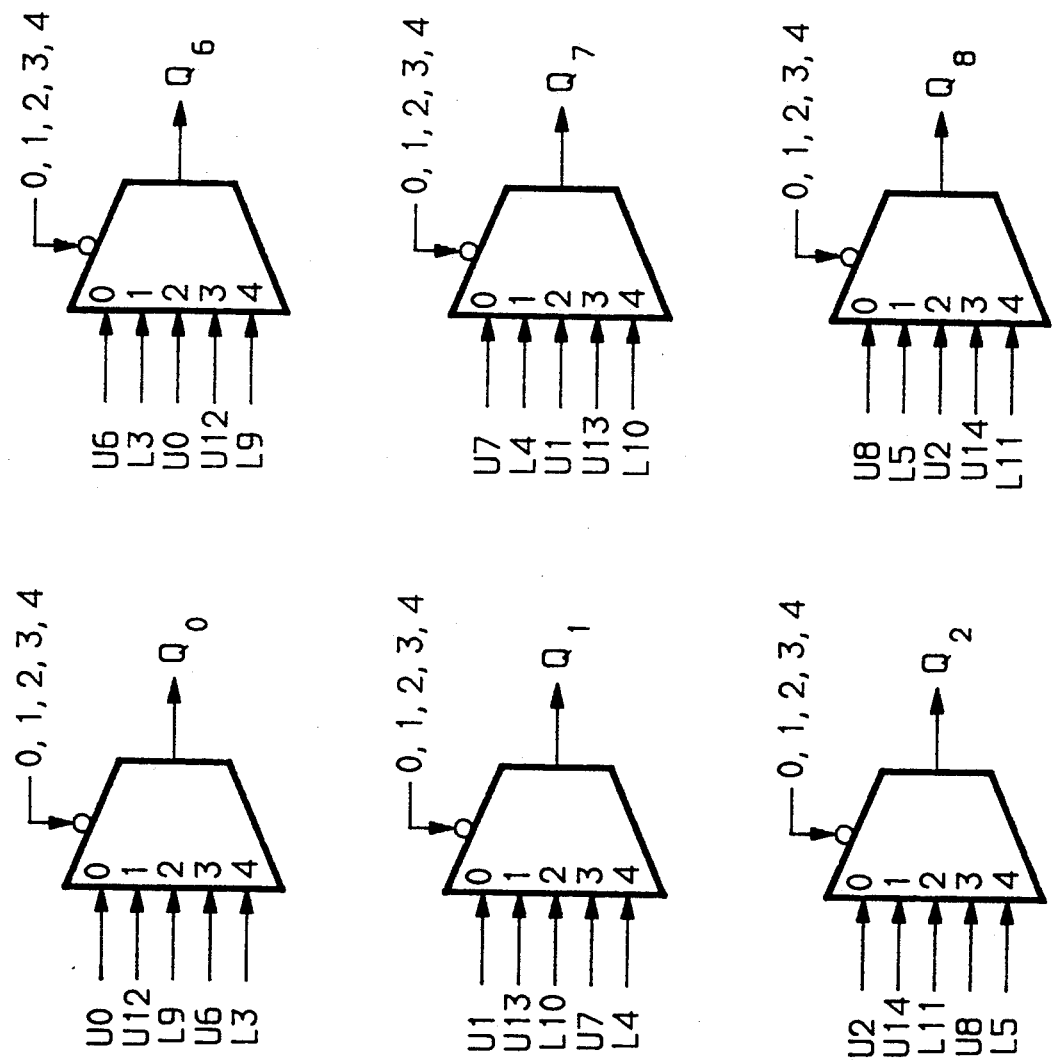
Figure 14B:
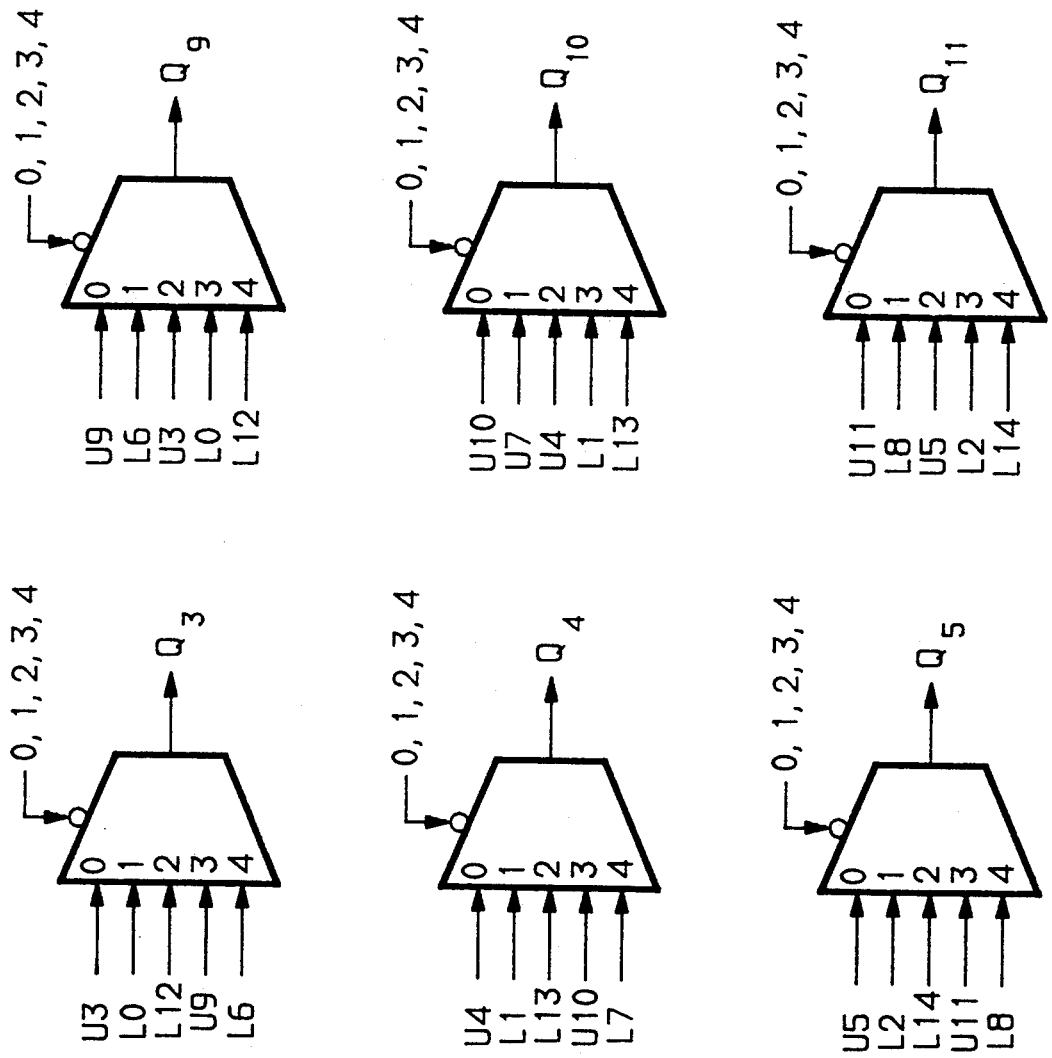
Figure 14B:
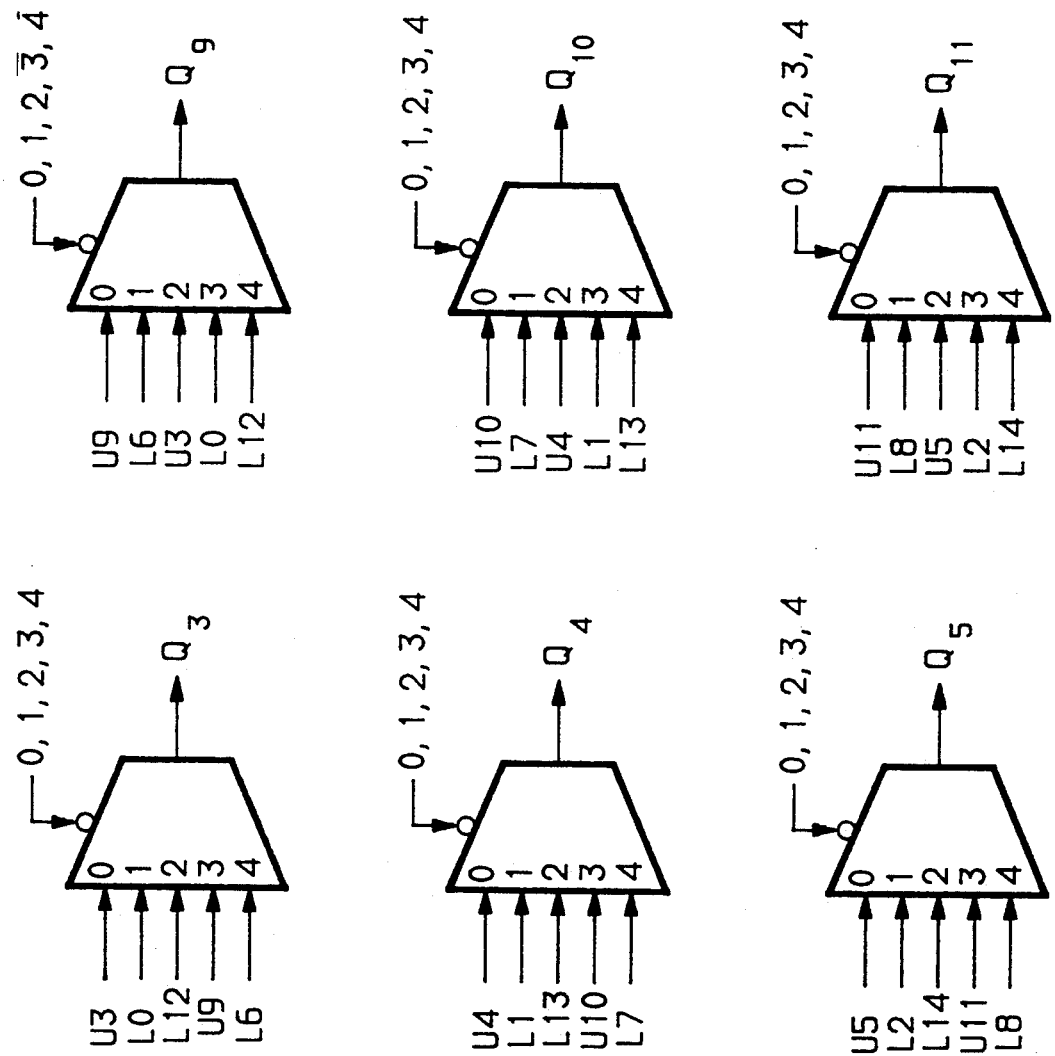

FIG. 13 depicts the 5 possible ways of multiplexing the proper 12 bits from the upper and lower SBI-E channels as read from the transmit memories 100, 102. Bits 12, 13 and 14 of the VT2 channel are stuffed with zeros. Refer to FIGS. 14(a) and 14(b) for the muxing algorithm. The correspondence between the VT2 row and select state is shown in the following translation table:

| ROWS | Select State (ss) |
|---|---|
| 2,7,12,17,22,27,32,33 | 0 |
| 3,8,13,18,23,28,34 | 1 |
| 4,9,14,19,24,29,35 | 2 |
| 0,5,10,15,20,25,30 | 3 |
| 1,6,11,16,21,26,31 | 4 |

Refer to FIGS. 7(a) and 7(b) for VT2 row designation.

A parity calculation block 302 calculates the parity of the reformatted 12 bit VT2 channel and inserts odd parity into the 15th bit as shown. Bits 12, 13 and 14 are stuffed with zeros.

The address is provided by a TXADR multiplexer 106 which is responsive to the 10 bit address on the line 65 for write operations and to a similar address bus on a line 108 from a connect memory 110 for read operations. The write address stores the incoming SBI data in the appropriate upper or lower switch memory and the read address writes selected channels to the reformatter block 104.

Thus the block 106 encodes the read and write address from/to the upper and lower transmit switch memories 100, 102 to perform payload channel multiplexing and overhead channel multiplexing. For this embodiment, the read and write cycles may be interleaved at 8.192 MHz. Each switch memory 100, 102 may, for example, be 128 × 16 bits long. (This permits us to ensure that data is not overwritten before it is read). As mentioned, in the TXSM write cycle, some of the data received on the SBI data inputs is stored in the upper and some in the lower SMs. The corresponding 10 bit SBI address received on the address inputs of the mux ASIC is encoded into a 7 bit address and used during the write cycle to the TXSMs. A transmit write block (not shown) encodes the 10 bit address into a 7 bit address. While the TXSMs 100, 102 are being written to, the connect memory 110 is being read. The data read from the connect memory becomes part of the address (5 bits) from which the TX SM will be read during the next clock cycle. The remaining 2 bits, required by the address field, are encoded from 5/6 bit PGEN row counters 122a, 123 shown in FIG. 19. The 5/6 bit PGEN row counters are located in an STSGEN block 124. A transmit address read block (not shown) encodes the 10 bit read address into a 7 bit address.

Figure 19:
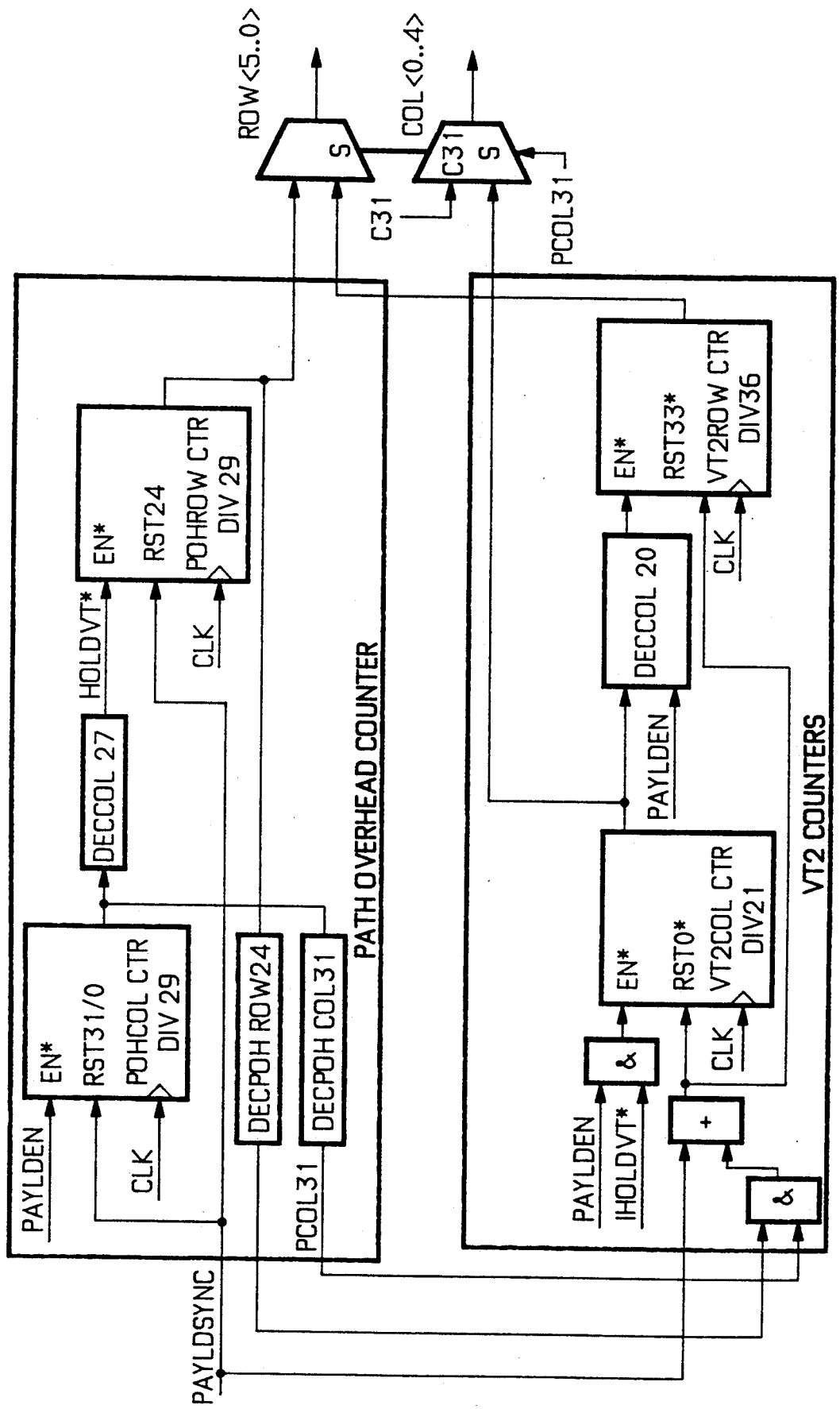
FIG. 19 shows path overhead and VT2 counters.

The STSGEN block 124 includes a payload generator block as shown in detail in FIG. 19. The payload counters consist of two 5 bit column counters and 2 row counters: 5 bit and 6 bit. One set of column, row counters will generate the 21 column addresses and 36 row addresses required to support the VT2 payload. The second set will determine the path overhead channels (POH) are to be read and will hold the VT2 column/row counters in their current state. The VT2 column/row counters will be held when the POH is at the count of 27.

The VT2 payload column address is incremented every other CLK 16M clock on every valid payload byte and when a POH channel is not the corresponding address. The payload generator of FIG. 19 will generate the signal that identifies whether or not the current address is valid. The maximum column address is 20.

The VT2 payload row address is incremented every time the VT2 payload column address corresponds to 20. The maximum row address is 35.

The POH column address is incremented every other CLK 16M clock on every valid payload byte. The maximum column address is 31. The POH row address is incremented every time the POH column address corresponds to 27. The maximum row address is 26.

The column/row addresses may be synchronized to 1 of 3 sources: STS address input J1, external synch sources and free running. The A2MBFSO output will go high for 2 consecutive CLK 16M clock periods when the PGEN counter corresponds to column 2, row 28. This signal is used by the 2 Mb-A transmitting device to output the first bit corresponding to bit 0 of link 0 channel 0. The mux ASIC uses this signal to insure that the TX SM FIFO is not broken.

The microprocessor serial interface 114 is used to configure the connect memory 110. A read or write to connect memory is performed upon command. The connect memory 110 is configured via an asynchronous, half duplex serial communication serial interface incorporated in the microprocessor serial bus interface 114. As mentioned, during normal mode of operation the connect memory is read while the storage array (transmit/receive switch memory) is being written. The data read from the connect memory becomes the address from which the storage array will be read by the reformatter 104 during the next clock cycle.

Figure 5B:
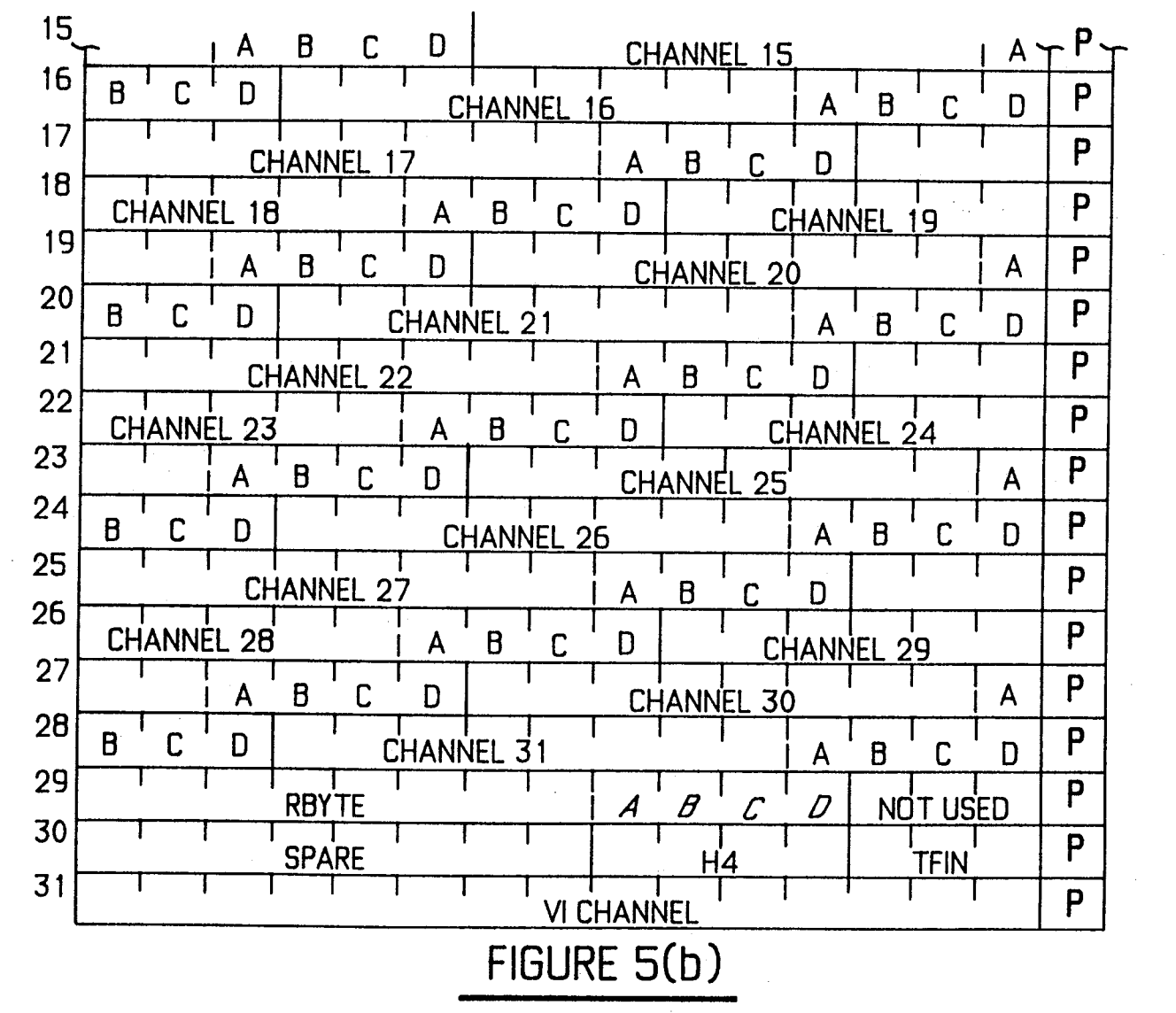

In the add direction, the SBI links as shown in FIGS. 5(a) and 5(b) are mapped into similarly numbered columns as shown in FIGS. 7(a) and 7(b). In the drop direction, the opposite is true.

Figure 10A:
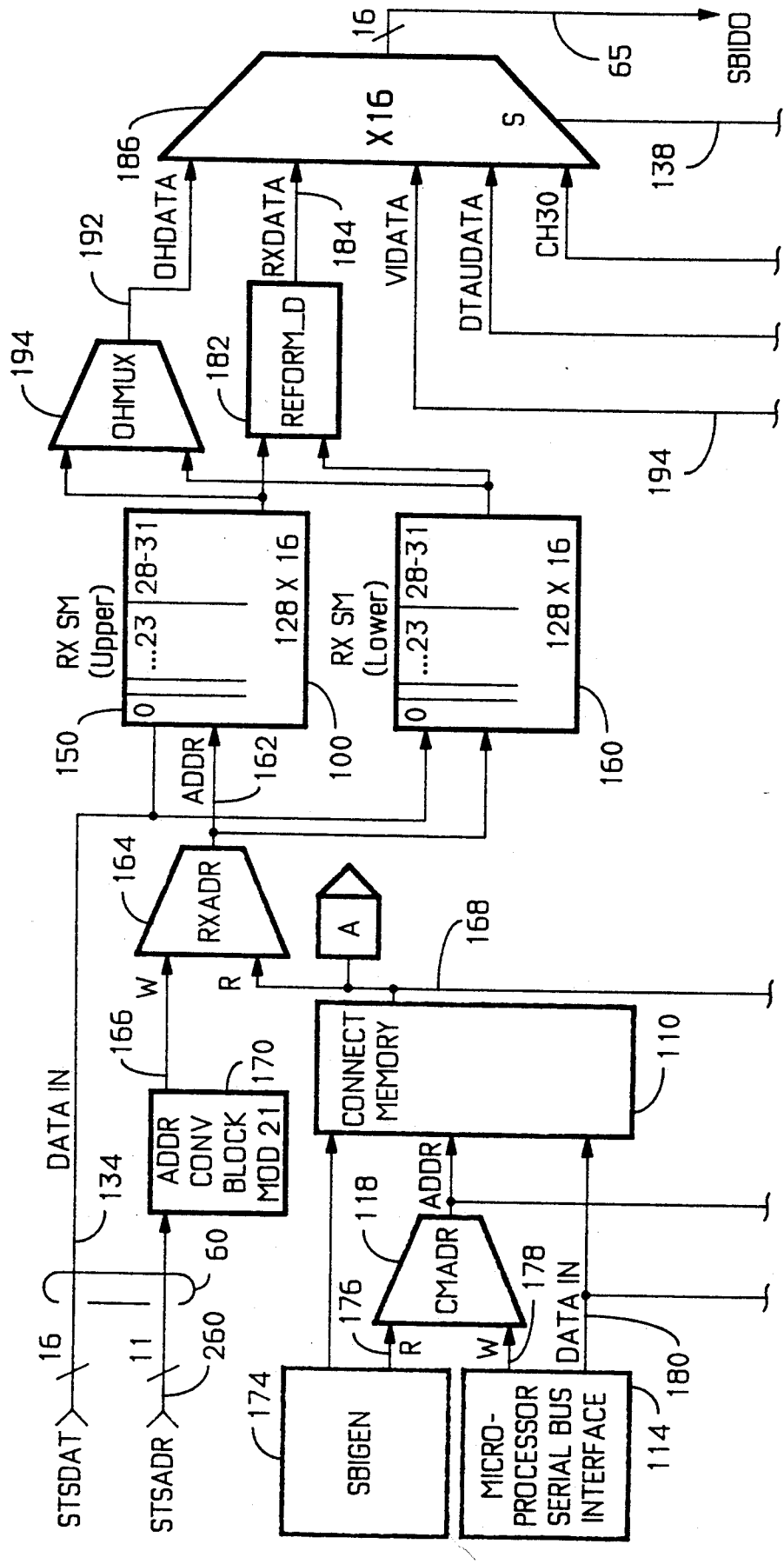
Figure 10B:
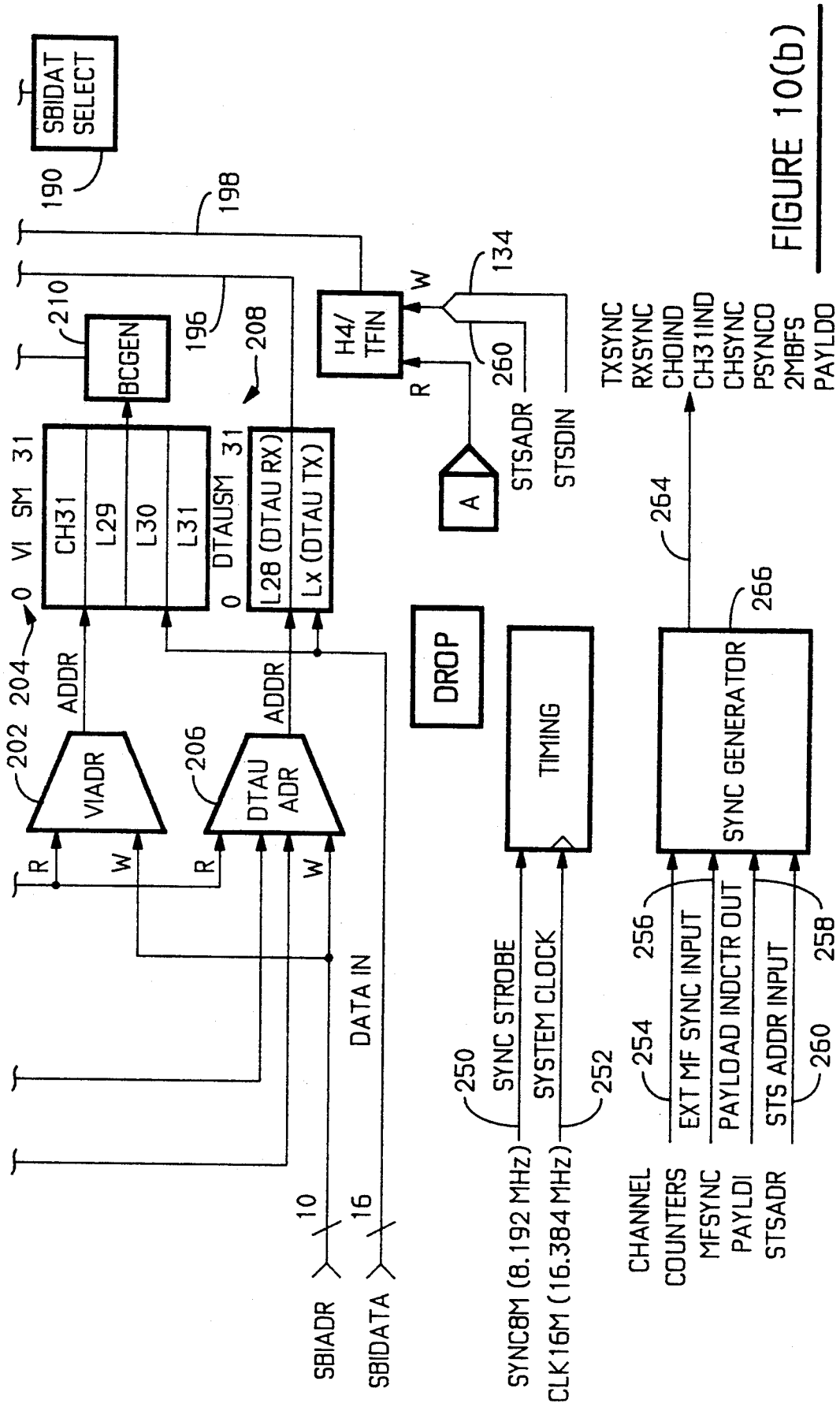

The connect memory 110 is shown shaded along with several other blocks in FIG. 9 and in FIGS. 10(a) and 10(b) of the mux ASIC 62 to indicate that the shaded blocks are common to both FIG. 9 and FIGS. 10(a) and 10(b). In other words, they are common to both the add and drop functions while the unshaded blocks are not.

The connect memory 110 is responsive to a DATA IN signal on a line 112 from the microprocessor serial bus interface 114 and responsive to an address signal on a line 116 from a CMADR having a function of generating the write and read addresses.

The CMADR encodes a read address 120 from the STSGEN block 124 and encodes a write address 122 from the microprocessor serial bus interface 114.

The outputs of the upper and lower transmit switch memories 100, 102 are provided to both the reformatter A104 and overhead mux 126. The transmit overhead mux 126 selects the proper overhead byte from the upper and lower transmit memories 100, 102. The reformatter 104 provides transmit data on a line 128 continuously at 8.192 MHz.

A block 140 selects the STS data (either payload or overhead) to be provided to the STS 1 interface 14a. The data transmitted on to the STS data outputs on line 60 is selected according to a table stored therein (as shown in FIGS. 7(a) and 7(b)).

Thus, the data that appears on the STS data outputs 60 are assigned an STS column and row address. As explained, these addresses are generated by the STSGEN block 124 via payload and frame counters (as shown in FIG. 19). The payload and frame addresses are multiplexed prior to leaving the STSGEN block 124. Specific synchronization signals are also generated by this block. FIGS. 7(a) and 7(a) show VT2 mapping in the SONET frame and row designation.

A frame generator block (not shown) having counters is also provided within the STSGEN block 124. The frame counters consist of one 5 bit column and one 5 bit row counter. The column address is incremented every other CLK 16M clock, except during a hold which occurs a predefined column/row addresses (refer to FIGS. 7(a) and 7(b)). The hold addresses are decoded from these frame generator counters. The maximum column address is 31. The row address is incremented every time the column address goes from 27 to 28. The maximum row address is 26. The column/row address may be synchronized to the STS address input A1=column 28, an external synch source, or free running. The FSYNCO output will go high twice per frame for two CLK 16M clock periods each. One pulse occurs when the STS data outputs correspond to an STS address of column 28, row 15 and the second occurs when the address is column 31, row 24. A PAYLDO output will go high when the STS data output corresponds to the synchronous payload envelope data. This consists of STS column addresses between 0 and 20, or equal to 31, and only when no hold in the column count occurs.

Both the TX data on the line 128 and the overhead data on the line 130 are provided to a multiplexer 132 which is also responsive to an STS data signal (STSDAT) on a line 134 from the STS high speed interface data input lines. This is a "through path between east and west". The mux can be configured to be transparent to the data (i.e., no cross-connect is performed).

The multiplexer 132 selects between the transmit data, the overhead data and the STSDAT signal for providing an STSDO signal on a line 60 being selected according to the magnitude of a selection signal on a line 138 from an STSDAT select 140 which synchronizes when data is to be put on the bus 60. The following table shows the select states of the STSDAT select 140.

| SELECT STATE | DEFINITION |
| --- | --- |
| 0 | All unconnected VT2s are connected to a hardware all ones idle pattern by default. |
| 1 | All unconnected VT2s are connected through. |
| 2 | The data extracted from the TX SMs an reformatted is output or The overhead data is output from the TX SMs. |
| 3 | RSVD POH bytes are connected to a hardware all "0"s idle |

The STSDO signal on the line 60 corresponds to the signal on line 60 in FIG. 8 between the electrical high speed interface 14a and the TSM-E 10a.

The circuitry for the drop direction is shown in FIGS. 10(a) and 10(b) and is responsive to an STSDAT signal on the line 60 from the high speed interface 14a. Incoming data is provided to a different set of upper 150 and lower 160 receive switch memory banks. As for the add direction, the writing of the lower 16 bits of data into the memories alternates every other word between the upper and lower banks according to the magnitude of an address signal on a line 162 from a receive address mux 164 controlled by a write signal on a line 166 and a read signal on a line 168. The write signal on the line 166 is provided by an address conversion block 170 which performs a modulo 21 counting function for counting VT2s.

The block 164 encodes the read and write addresses from/to the upper and lower receive switch memories 150, 160 to perform payload channel multiplexing and overhead channel multiplexing. The read and write cycle are interleaved at 8.192 MHz. Each switch memory is 128×12 bits long. In the memory write cycle, the data received on the STS data inputs is stored in the upper and the lower memories. The address used to store the STS data is generated by the address conversion block 170. The 10 bit address received from the conversion block 170 is encoded into a 7 bit address and used during the write cycle on the receive switch memories 150, 160. A receive address write block (not shown, within the RXADR 164) encodes the 10 bit address into a 7 bit address. A write enable strobe (not shown) is derived from the 11 bit address on the line 260 generated by the address conversion block 170. Write access to the upper and lower memories 150, 160, depends on 3 factors: (1) the presence or absence of the write enable strobe, (2) whether or not the channel to be written is odd or even (with the exception of the transport and path overhead bytes) and (3) STS address bit 10 has to be low.

The address used to write to the upper and lower switch memories is derived from 1 of 2 sources: (1) the STS address inputs and (2) the address generated by a 21×36 payload counter in the address conversion block. The selection is determined by the actual STS address inputs. Column addresses 28, 29, 30, 31 will select the STS address inputs, and column addresses 0-27 will select the 21×36 payload counter address. The payload counters consist of 1 5-bit column counter and 1 6-bit row counter. The column and row counters will generate the 21 column and 36 row addresses required to support the VT2 payload. The VT2 payload column address is incremented every other CLK 16M clock on every valid payload byte and when a transport or payload overhead byte (column 28-31) is not the corresponding address. STS address bit 10 will identify whether or not the current address is valid (active low). The column address begins at 0 and has a maximum address of 20. The VT2 payload row address is incremented every time the VT2 payload column address changes from 20 to 0. The row address begins at 0 and has a maximum address of 35. The payload counter is reset to column 3, row 2, on STS address input column 24 row 0.

While the receive switch memories 150, 160 are being written to, the connect memory is being read. The data being read from the connect memory becomes part of the address (5 bits) from which the receive switch memory 150, 160 will be read during the next clock cycle. The remaining 2 bits, required by the address field, are encoded from the 5 bit channel counter generated by the SBIGEN block 174. A receive address read block (not shown) encodes the 10 bit read address into a 7 bit address.

A portion of read address 168 is encoded from the data read from the connect memory 110 which is in turn controlled by the CM address mux 118 and the serial bus interface microprocessor 114, both previously discussed in connection with FIG. 9. An SBI generator (SBIGEN) 174 provides a read address signal on a line 176 derived from the link and channel counters. The MSI (microprocessor serial bus interface) 114 provides a write address signal on a line 178 in response to a write command from the network controller and provides a DATA IN signal on a line 180. The DATA IN signal has the function of providing the connect memory provisioning information.

The data that appears on the SBI data outputs on line 65 are assigned an SBI link and channel address in the SBIGEN block 174. These addresses are generated by the SBIGEN block via link and channel counters. Specific synchronization signals are also generated by this block.

The RXADR block 164 encodes the current STS address to generate a write address and a write strobe and encodes a read address from the data read out of the connect memory 110 and from the SBI address generated by the SBIGEN 174. The address input to the CMADR block 118 alternates between the STSGEN counter 124 address output and the SBIGEN counter 174 address output at 16 MHz. The encoded read address is 8 bits wide (256 possible addresses). The crossconnect function is performed during these read cycles.

Depending on the address to be read out, a reformatter D mux 182 selects the appropriate combination of bits from the lower 12 bits of the two 16 bit registers 150, 160 to form one 16 bit channel on a line 184 provided to a mux 186 for providing an SBI signal on the line 65 as shown for one of the channels of FIGS. 5(a) and 5(b).

Figure 15:
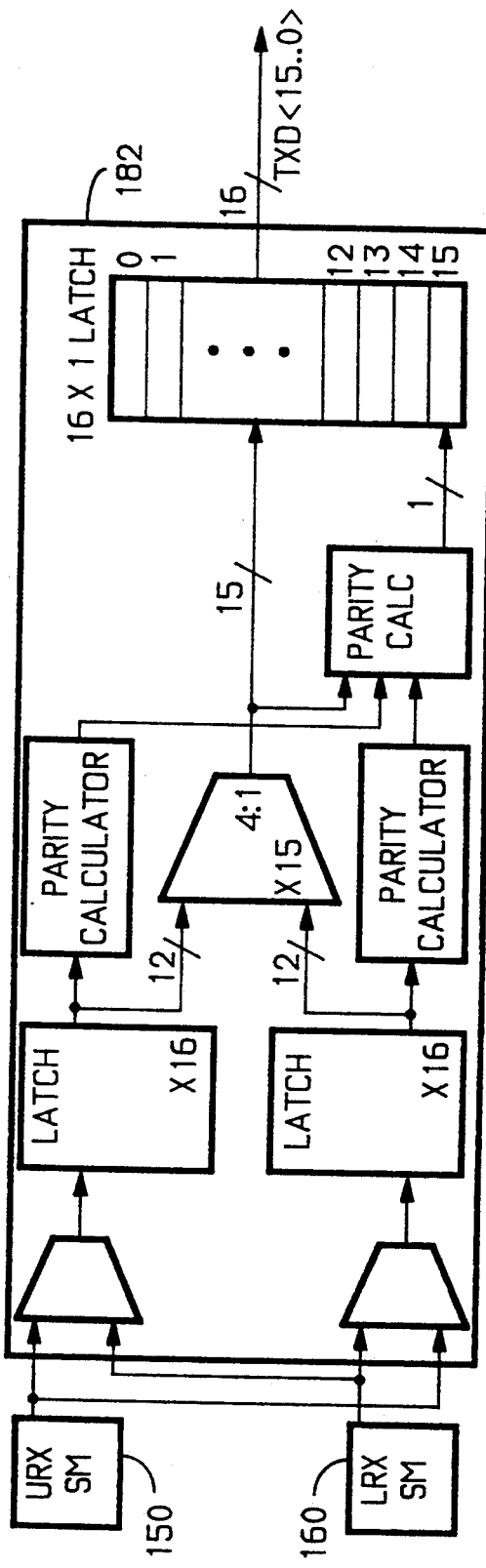
FIG. 15 shows the drop formatter of FIGS. 10(a) and 10(b) in detail.
Figure 17A:
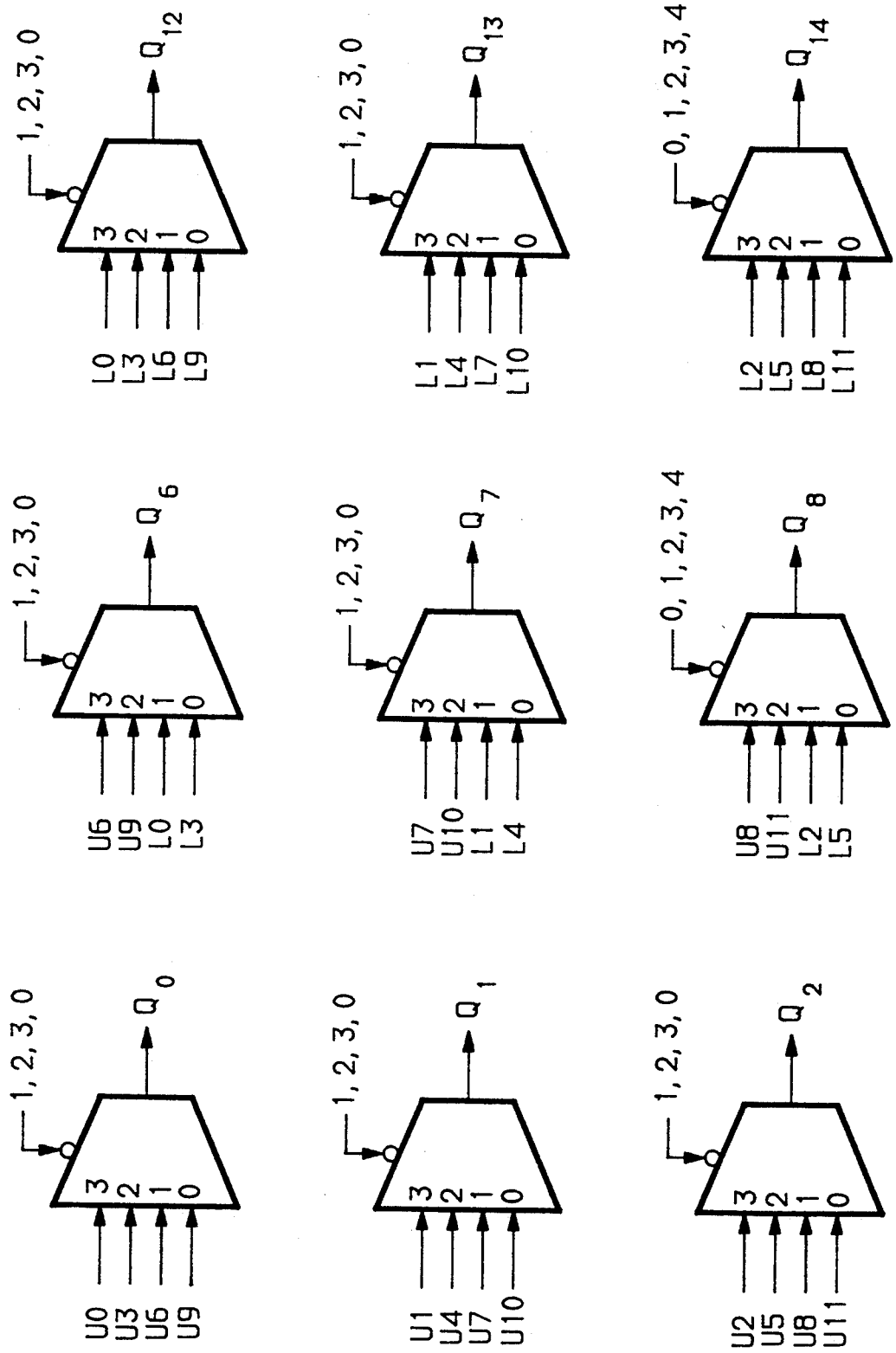
Figure 17B:
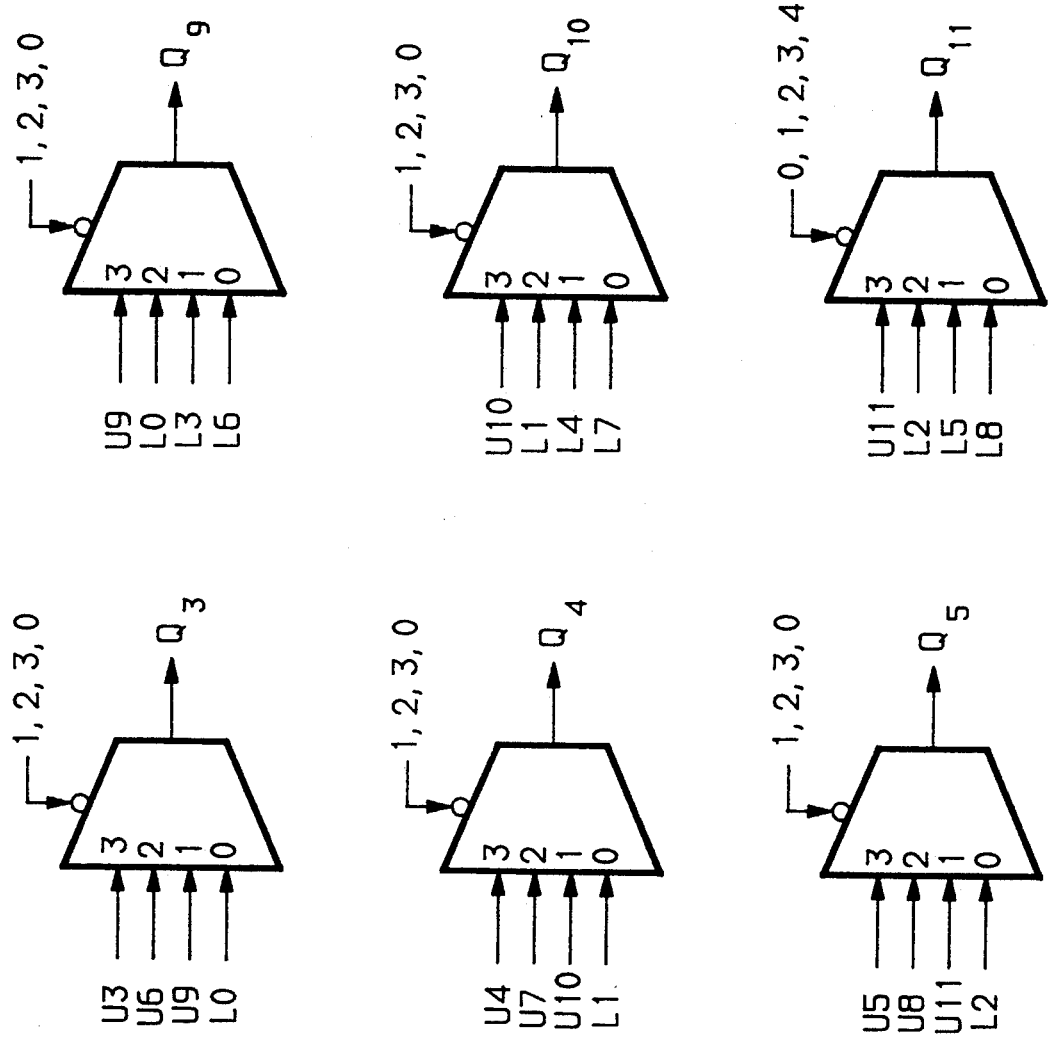

Referring now to FIG. 15, the drop reformatter block 182 of FIGS. 10(a) and 10(b) is shown in detail. This block multiplexes the two 13 bit channels read from the upper and lower RX memories 150, 160 into one 15 bit channel. The proper 15 bit SBIE channel is selected by using the channel value which was used to read the RX memories. FIG. 16 depicts the four possible ways of multiplexing the proper 15 bits from the upper and lower VT2 words read from the RX memories 150, 160. FIGS. 17(a) and 17(b) show the multiplexing algorithm.

The mux 186 is controlled by a SBI data (SBIDAT) select 190 in response to link/channel addresses from the SBIGEN counter, the data read from the connect memory and the contents of the control register. In addition to the RX data signal on the line 184, the multiplexer 186 is responsive to an overhead data signal on a line 192 from an overhead mux 194 which provides one or the other of its inputs from switch memories 150, 160 according to the select logic in the RXOHMUX 194.

In addition to the overhead data signal on the line 192 and the receive data on the line 184, the multiplexer 186 is responsive to three other signals on line 194, 196, 198. The VIDATA signal on line 194 outputs the respective VI byte to a given SBI link. The DTAUDATA signal on line 196 outputs test access data. The channel 30 signal on line 198 outputs the respective channel 30 to a given SBI link.

Toward the bottom of FIGS. 10(a) and 10(b) are shown a number of timing and synch generator signals which will now be explained. These are not part of the present invention but will be described briefly.

A VIADR block 202 encodes read (from CM) and write (SBIADR) addresses from/to a VI switch memory 204 to perform SBI to SBI channel multiplexing. The read and write signal will be interleaved at 8.192 MHz. The VI switch memory 204 is 128×16 bits long. The SBI addresses that may be multiplexed to the SBI outputs include the SBI VI control (links 0-31, channel 31), SBI link 29 channels 0-30, SBI link 30, and SBI link 31, channels 0-30. This data is received on the SBI data inputs and stored in the VISM 204. The address used to store the SBI data is generated by a VI address write block (not shown). The 10 bit address received on the SBI address input is encoded into a 7 bit address and used during the write cycle on the VISM 204. The VI address write block encodes the 10 bit address into a 7 bit address. A write enable strobe (not shown) is derived from the 10 bit SBI address input by a VI write enable block (not shown). While the VISM 204 is being written to, the connect memory is being read. The data read from the connect memory becomes part of the 7 bit address from which the VISM will be read during the next clock cycle. The VI address read block generates the proper 7 bit read address.

Figure 20:
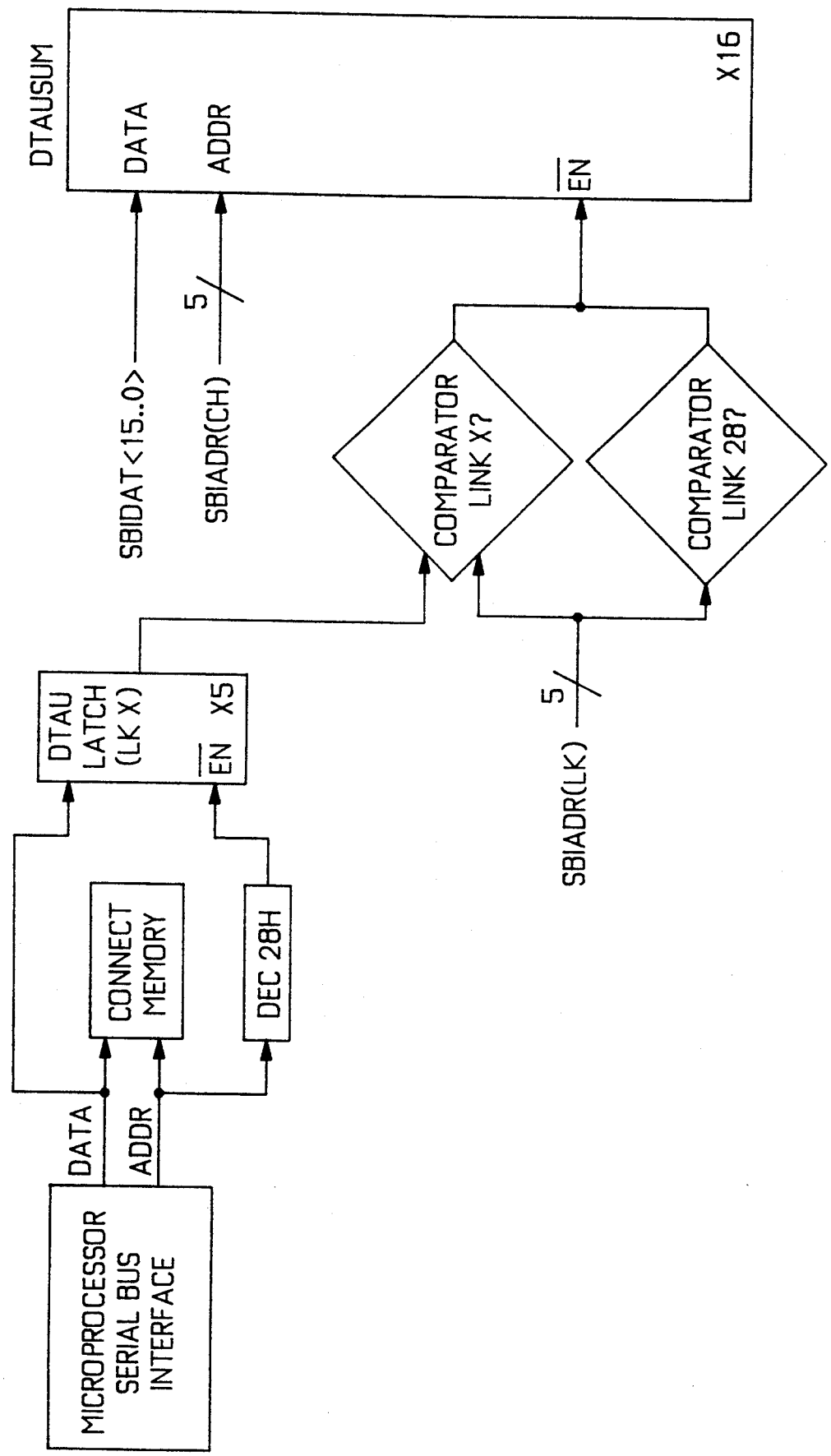
FIG. 20 shows a DTAU switch memory for storing SBI data and address information.

A DTAU ADR block 206 encodes the read and write addresses from/to a DTAU memory 208. A block diagram showing the function of the DTAU transmit/receive write function is shown in FIG. 20. These allow a test access in the drop direction. The DTAU memory 208 is 64×16 bits long. The DTAU memory contains DTAU received data (SBIX to SBI 28) and DTAU transmit data (SBI 28 to SBIX).

A broadcast generator 210 selects the data read from the VI memory 204 to be transmitted either in the SBI format or the SBIE format. When the broadcast selection has been chosen for a given link, the broadcast channels (linked 31, channels 9, 10 and 11) have to be reformatted to the SBIE map. At all other times the data will be in the SBI format.

Also, at the bottom of FIGS. 10(a) and 10(b) are shown a number of signals which are relevant to the present invention. A synch strobe signal on a line 250 enables the SBI data input on the line 66a and the STS data input on the line 60 to be clocked into the mux ASIC. It is an 8.192 MHz clock of a fixed phase relatively to the input data. A system clock signal on a line 252 at 16.34 MHz is used for synchronizing all functions within the mux ASIC. The timing of the synch strobe and system clock signals on lines 250, 252 are shown by waveforms in FIG. 11B (b) and (a), respectively, in relation to address and data in signal timing in FIG. 11B (c) and synchronization and data output signal timing shown in FIG. 11B (d). A link and channel counters signal on a line 254 is from the SBIGEN block 174 and performs the function of determining what data appears on the SBI data output bus 65. An external multiframe synch input signal on a line 256 is only monitored in VT grooming modes for synchronizing the transmitting and receiving devices. In the appropriate mode it is used to generate the multiframe information to the 2 Mb interface 12. The MFSYNC signal consists of a pattern of three consecutive bits occurring at a rate of 8 Khz. The bits are 122 ns wide (8.192 MHz). The first bit will always be 1, indicating the start of the frame synch. The next 2 bits will count up every frame, repeating every 4 frames. A 3-bit pattern of 100 will be equivalent to the STS 1-data input bit 14 changing from 0 to 1 or 1 to 0 during the next H4 bit location. A payload indicator output signal on a line 258 provides a high level whenever the data on the STS data outputs on the line 60 in FIG. 9 correspond to an STS address of column 0-20 and column 31 with any row 0-35 (payload) or row 0-26 (payload overhead). An STS address input signal on a line 260 has bits 10-0. The 11 STS address inputs are divided into 3 parts: STS A10 is the invalid indicator bit, STS A9-5 form the 5-bit column address and STS A4-0 form the 5-bit row address. The column and row addressed pertain to the tables shown in FIGS. 7(a) and 7(b). The STS data input signal on the line 134 has an active level representative of the positive data that has been received from the STS 1 interface 14a. A signal line 264 from a synch generator 266 provides, in response to the previously described signals 254, 256, 258, 260, a plurality of signals to be described.

Figure 11A:
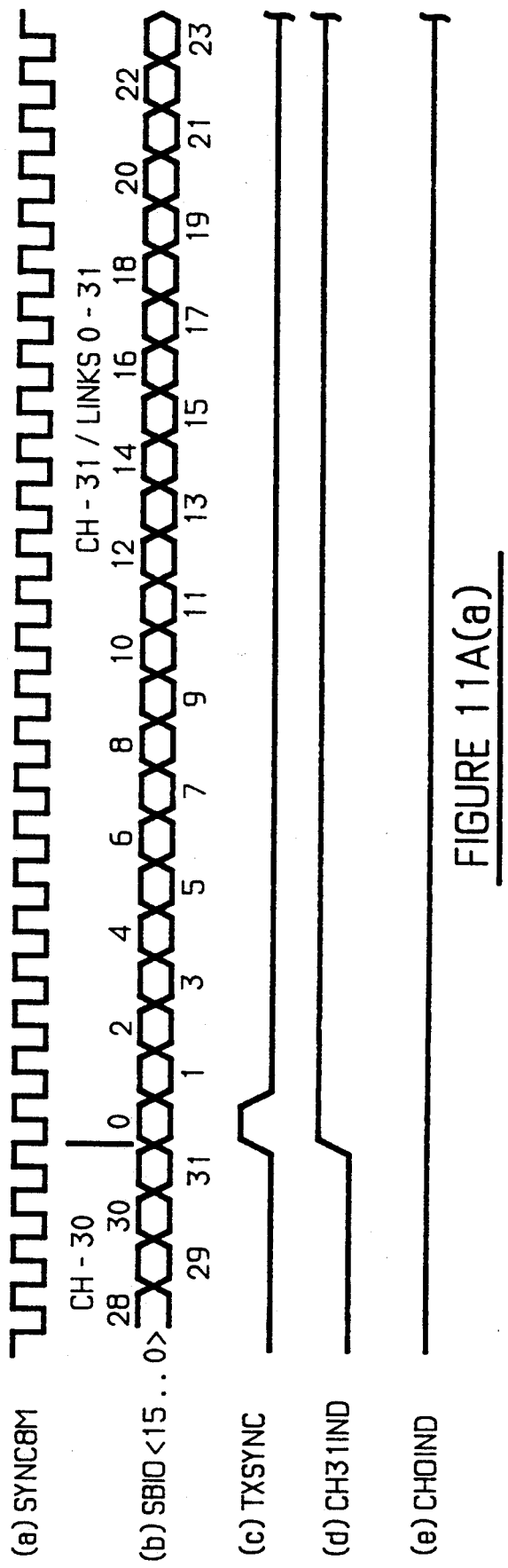
FIG. 11A shows how FIGS. 11A(a) and 11A(b) fit together.

A TXSYNC signal is an SBI transmit synch bidirectional signal at 256 Khz. It is provided to synchronize the SBI ASICs, i.e., to tell the SBI ASICs that SBIDO=LINK 0 (abbreviated address encoding). When an identification input signal (IDIN) for identifying the mux ASIC as the 1 of 2 62, 64, to the microprocessor serial bus, i.e., when IDIN is low, the output part is turned on, and a high level occurs on this output for 122 ns when the data on the SBI data outputs correspond to an SBI address of link 0 for every channel. This signal is shown in FIGS. 11A(a) and 11A(b), being shown among a plurality of several waveforms on a common time line. When IDIN is high, the output part is tri-stated and an input pulse of 122 ns will synchronize the SBI address of the SBI data outputs to link 0.

An RXSYNC signal is provided to the SBI ASICs to tell them when to send the EMUX channel 30, as an SBI RX synch output at 256 Khz. A high level on this occurrence output for 122 ns when the SBI address inputs should be link 30 for every channel.

A channel 0 indicator signal (CH0IND) is provided to tell the SBI ASIC that SBIDO=channel 0, and provides a high level whenever the data on the SBI data outputs correspond to an SBI address of channel 0 for any link. Similarly, a channel 31 indicator signal (CH31IND) provides a high level whenever the data on the SBI data outputs correspond to an SBI address of channel 31 for any link. Both of these signals are shown in waveform (e) and (d), respectively of FIGS. 11A(a) and (b).

The SBI data output signal on the line 188 of FIGS. 10(a) and (b) has a waveform as shown in waveform (b) of FIGS. 11A(a) and 11A(b); and comprises 16 bits. An active level on these outputs represents the positive data to be sent to the SBI ASIC. The outputs are tri-stated when configured to be disabled.

Figure 18:
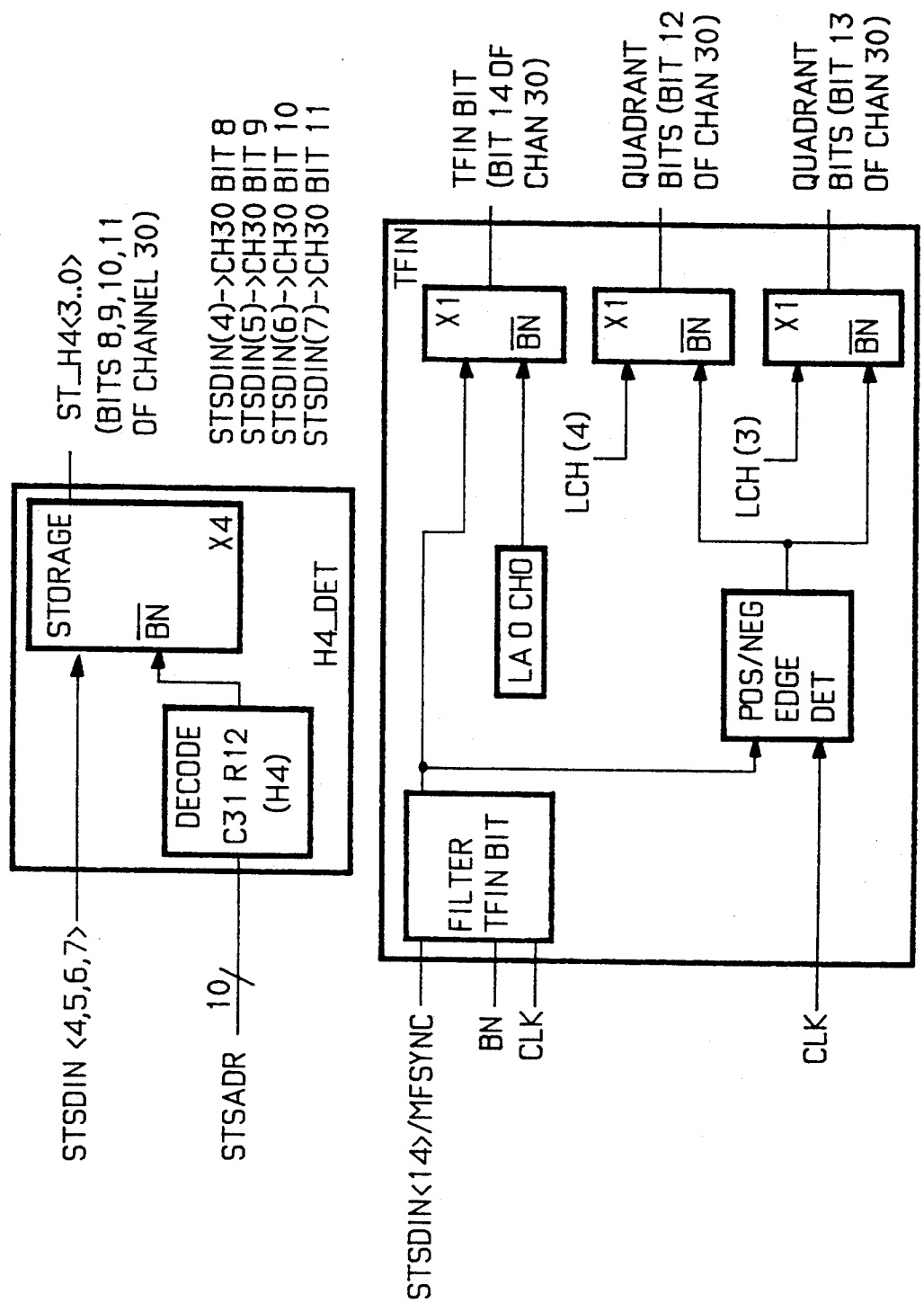
FIG. 18 shows an H4 DET block and a TFIN block.

Referring now to FIG. 18, in order to reduce the word length of the SBI channel to 12 bits, the signalling multiframe indicator bits (bits 12 and 13) and the transmit multiframe indicator bit (TFIN, bit 14) are not transmitted in each SBI channel as is done for VT1.5s. Instead, the mux ASIC transmits the needed information once per frame with a resolution of one-quarter frame minimum. The multiframe synch channel (channel 30) is used for this purpose. It consists of two parts: the multiframe indicator (H4) and the TFIN bits. This subset of the SBI link interface is specific to the two MB ports, and is referred to as the SBIE links.

The multiframe indicator (H4) will originate from either the east or west side depending on the drop connection provisioned. The H4 nibble will be sent once per SBIE frame in channel 30 (see FIGS. 5(a) and (b) for SBIE channel assignments).

The TFIN bits are used to tell the two MB-A ASIC when to transmit the beginning of the it's VT super frame. This is done to a resolution of within one-quarter one an SBIE frame. For this reason, three bits are used.

The synchronous transport signal level 1 IC 54 of FIG. 8 derives the TFIN state from the H4 bit six for ANSI T1.105, and outputs the TFIN bit on the high speed parallel data interface bus (bit 14). The mux ASIC will insert a filtered TFIN bit (as is) into bit 14 of channel 30 of every frame. The H4 block generates channel 30 of the SBIE frame.

Although the invention has been shown and described with respect to a best mode embodiment thereof, it should be realized that various embodiments of the invention may be made and still be within the spirit and scope thereof as claimed below.

What is claimed is:

1. Apparatus for processing digital signals transported in frames having ninety columns and nine rows of bytes with three columns of overhead data and eighty-seven columns of payload data divided into seven groups of virtual tributaries having sizes of twenty-seven, thirty-six, fifty-four, or one hundred four bytes according to a synchronous optical network (SONET) standard, comprising:
   first means, responsive to an incoming parallel signal having an underlying second virtual tributary size but mapped according to a first virtual tributary size, for providing the incoming signal in a serial transport frame format sized for the first virtual tributary size; and
   second means, responsive to an outgoing signal having the underlying second virtual tributary size but in the serial transport frame format sized for the first virtual tributary size, for providing the outgoing signal as an outgoing parallel signal mapped according to the first virtual tributary size.

2. A reformatter for reformatting digital data signals transported in frames having payload bytes divided in groups of bytes, the groups being subdivided into virtual tributaries (VTs) having a number of bytes selected according to a synchronous optical network (SONET) standard specifying sizes of VTs by number of bytes, the reformatter comprising:
   a drop encoder, responsive to incoming address signals mapped according to a first virtual tributary (VT) size and responsive to incoming parallel data signals of a second VT size, for providing the data signals in one or more channels of a serial transport frame sized for the first VT size; and
   an add decoder, responsive to outgoing data signals of the second VT size in one or more channels of the serial transport frame sized for the first VT size, for providing the outgoing data signals as parallel data signals of the second VT size and for providing outgoing address signals mapped according to the first VT size.

3. The reformatter of claim 2, wherein the drop encoder comprises:
   a receive memory, responsive to the incoming address and data signals of the second VT size for storing a last two successive of the incoming data signals for providing the last two successive stored data signals; and
   drop multiplexer means, responsive to the last two successive stored data signals of the second VT size and responsive to a select signal, for providing the last two successive stored data signals for one or more channels of the serial transport frame sized for the first VT size.

4. The reformatter of claim 3,:
wherein the drop multiplexer means, is responsive to the select signal and to the last two successive stored data signals, for providing selected bits of the last two successive stored data signals for a channel of the serial transport frame sized for the first VT size.

5. The reformatter of claim 2, wherein the add decoder comprises:
a transmit memory, responsive to the outgoing data signals of the second VT size in one or more channels of the serial transport frame sized for the first VT size, for storing a last two successive of the outgoing data signals of the serial transport frame sized for the first VT size for providing the last two successive stored data signals; and
add multiplexer means, responsive to the last two successive stored data signals and responsive to a select signal, for providing the last two successive stored data signals as the outgoing parallel data signals.

6. The reformatter of claim 5, wherein the add multiplexer means is for providing selected bits of the last two successive stored data signals as the outgoing parallel data signals.

7. A method for processing data in signals divided in groups subdivided into virtual tributaries (VTs) having a number of bytes selected according to a synchronous optical network (SONET) standard specifying sizes of VTs by number of bytes, comprising the steps of:
storing incoming high-speed data signals of a second selected VT size (VT2) as data of a first selected VT size (VT 1.5);
providing the stored incoming data signals of the second selected VT size (VT2) in a low-speed serial transport frame format (FIG. 5) for data of the first selected VT size (VT 1.5); and
translating outgoing low-speed data signals of the second selected VT size (VT2) to the low-speed serial transport frame format (FIG. 5) for data of the first selected VT size (VT 1.5), and storing the outgoing data of the second selected VT size (VT2) as data of the first selected TV size (VT 1.5).

8. A reformatter for reformatting digital data signals transported in frames having payload bytes divided in groups that are subdivided into virtual tributaries (VTs) having a number of bytes selected according to a synchronous optical network (SONET) standard specifying sizes of VTs according to number of bytes, the reformatter comprising:
a drop encoder, responsive to incoming address signals mapped according to a first virtual tributary (VT) size and responsive to incoming parallel data signals of a second VT size, for providing the data signals in one or more channels of a serial transport frame sized for the first VT size;
an add decoder, responsive to outgoing data signals of the second VT size in one or more channels of the serial transport frame sized for the first VT size, for providing the outgoing data signals as parallel data signals of the second VT size and for providing outgoing address signals mapped according to the first VT size;
a receive memory, responsive to the incoming address and data signals of the second VT size for storing a last two successive of the incoming data signals for providing the last two successive stored data signals;
drop multiplexer means, responsive to the last two successive stored data signals of the second VT size and responsive to a select signal, for providing the last two successive stored data signals for one or more channels of the serial transport frame sized for the first VT size; and
wherein the drop multiplexer means, is responsive to the select signal and to the last two successive stored data signals, for providing selected bits of the last two successive stored data signals for a channel of the serial transport frame sized for the first VT size.

9. A reformatter for reformatting digital data signals transported in frames having payload bytes divided in groups that are subdivided into virtual tributaries (VTs) having a number of bytes selected according to a synchronous optical network (SONET) standard specifying sizes of VTs, the reformatter comprising:
a drop encoder, responsive to incoming address signals mapped according to a first virtual tributary (VT) size and responsive to incoming parallel data signals of a second VT size, for providing the data signals in one or more channels of a serial transport frame sized for the first VT size;
an add decoder, responsive to outgoing data signals of the second VT size in one or more channels of the serial transport frame sized for the first VT size, for providing the outgoing data signals as parallel data signals of the second VT size and for providing outgoing address signals mapped according to the first VT size;
a transmit memory, responsive to the outgoing data signals of the second VT size in one or more channels of the serial transport frame sized for the first VT size, for storing a last two successive of the outgoing data signals of the serial transport frame sized for the first VT size for providing the last two successive stored data signals;
add multiplexer means, responsive to the last two successive stored data signals and responsive to a select signal, for providing the last two successive stored data signals as the outgoing parallel data signals; and
wherein the add multiplexer means is for providing selected bits of the last two successive stored data signals as the outgoing parallel data signals.

* * * * *